United States Patent
Baek et al.

(10) Patent No.: US 8,958,747 B2
(45) Date of Patent: Feb. 17, 2015

(54) MOBILE TERMINAL, MOBILE TERMINAL SYSTEM, AND METHOD FOR CONTROLLING OPERATION OF THE SAME

(75) Inventors: Sungmin Baek, Seoul (KR); Eunhae Cho, Seoul (KR); Jaehee Chung, Seoul (KR); Namhoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 164 days.

(21) Appl. No.: 12/954,466

(22) Filed: Nov. 24, 2010

(65) Prior Publication Data

US 2011/0165841 A1 Jul. 7, 2011

(30) Foreign Application Priority Data

Jan. 5, 2010 (KR) ............... 10-2010-0000525

(51) Int. Cl.
- *H04B 7/00* (2006.01)
- *H04L 29/08* (2006.01)
- *H04W 8/00* (2009.01)
- *H04W 76/02* (2009.01)

(52) U.S. Cl.
CPC ............... *H04L 67/06* (2013.01); *H04L 67/10* (2013.01); *H04W 8/005* (2013.01); *H04W 76/023* (2013.01)
USPC .......... 455/41.2; 345/173; 715/748; 715/702; 715/769; 455/556.1; 455/556.2

(58) Field of Classification Search
USPC .......... 455/41.1, 41.2, 556.1, 556.2; 345/173; 715/748, 702, 769
See application file for complete search history.

(56) References Cited

U.S. PATENT DOCUMENTS

| | | | | |
|---|---|---|---|---|
| 5,801,700 A | * | 9/1998 | Ferguson | 715/748 |
| 6,191,807 B1 | * | 2/2001 | Hamada et al. | 348/14.07 |
| 2003/0184647 A1 | * | 10/2003 | Yonezawa et al. | 348/143 |
| 2004/0063459 A1 | * | 4/2004 | Yamashita et al. | 455/556.1 |
| 2006/0146765 A1 | * | 7/2006 | Van De Sluis et al. | 370/338 |
| 2006/0258289 A1 | * | 11/2006 | Dua | 455/41.3 |
| 2007/0281667 A1 | * | 12/2007 | Minor | 455/414.1 |
| 2008/0068486 A1 | * | 3/2008 | Kusaka | 348/333.02 |
| 2008/0216125 A1 | * | 9/2008 | Li et al. | 725/62 |
| 2008/0318525 A1 | * | 12/2008 | Tanabe | 455/41.2 |
| 2009/0006955 A1 | * | 1/2009 | Wang et al. | 715/702 |
| 2009/0070675 A1 | * | 3/2009 | Li | 715/716 |
| 2009/0125571 A1 | * | 5/2009 | Kiilerich et al. | 707/204 |
| 2010/0167646 A1 | * | 7/2010 | Alameh et al. | 455/41.2 |
| 2010/0185736 A1 | * | 7/2010 | Jayaraman | 709/206 |

(Continued)

FOREIGN PATENT DOCUMENTS

| | | |
|---|---|---|
| CN | 1610424 A | 4/2005 |
| CN | 101163347 A | 4/2008 |

(Continued)

*Primary Examiner* — Nay A Maung
*Assistant Examiner* — Erica Fleming-Hall
(74) *Attorney, Agent, or Firm* — Birch, Stewart, Kolasch & Birch, LLP

(57) ABSTRACT

A mobile terminal which can enter a content share mode, a mobile terminal system, and a method for controlling the operation of the same are provided. After entering a content share mode, a mobile terminal can transmit and receive content to and from another mobile terminal which is in the content share mode and within a predetermined distance. The mobile terminal can also specify a content transmission format. Before the content is transmitted, the content may be displayed on another mobile terminal using a thumbnail of the content. Users can conveniently transmit content between mobile terminals.

10 Claims, 25 Drawing Sheets

(56) References Cited

U.S. PATENT DOCUMENTS

| | | | |
|---|---|---|---|
| 2010/0281363 A1* | 11/2010 | Inaba | 715/702 |
| 2011/0037712 A1* | 2/2011 | Kim et al. | 345/173 |
| 2011/0090349 A1* | 4/2011 | Kojima | 348/207.2 |
| 2011/0106755 A1* | 5/2011 | Hao et al. | 707/610 |
| 2011/0177802 A1* | 7/2011 | Gupta | 455/418 |
| 2011/0188483 A1* | 8/2011 | Lee et al. | 370/338 |
| 2012/0072853 A1* | 3/2012 | Krigstrom et al. | 715/748 |
| 2013/0044341 A1* | 2/2013 | Uchino | 358/1.13 |
| 2013/0080954 A1* | 3/2013 | Carlhian et al. | 715/769 |
| 2013/0125016 A1* | 5/2013 | Pallakoff et al. | 715/748 |
| 2014/0019874 A1* | 1/2014 | Li et al. | 715/748 |
| 2014/0040803 A1* | 2/2014 | Briand | 715/769 |

FOREIGN PATENT DOCUMENTS

| | | |
|---|---|---|
| CN | 101449552 A | 6/2009 |
| WO | WO 2007/137626 A1 | 12/2007 |

\* cited by examiner

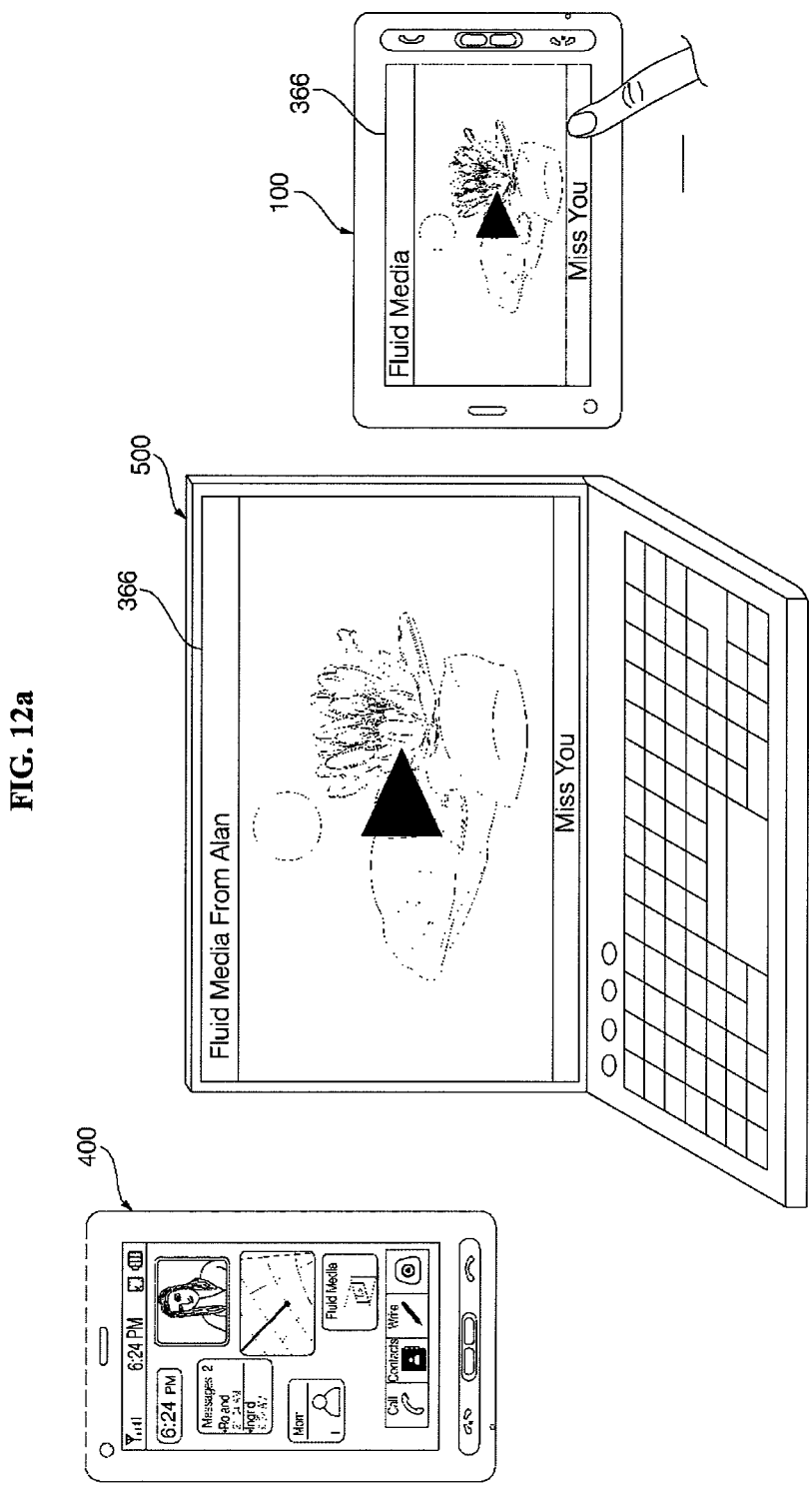

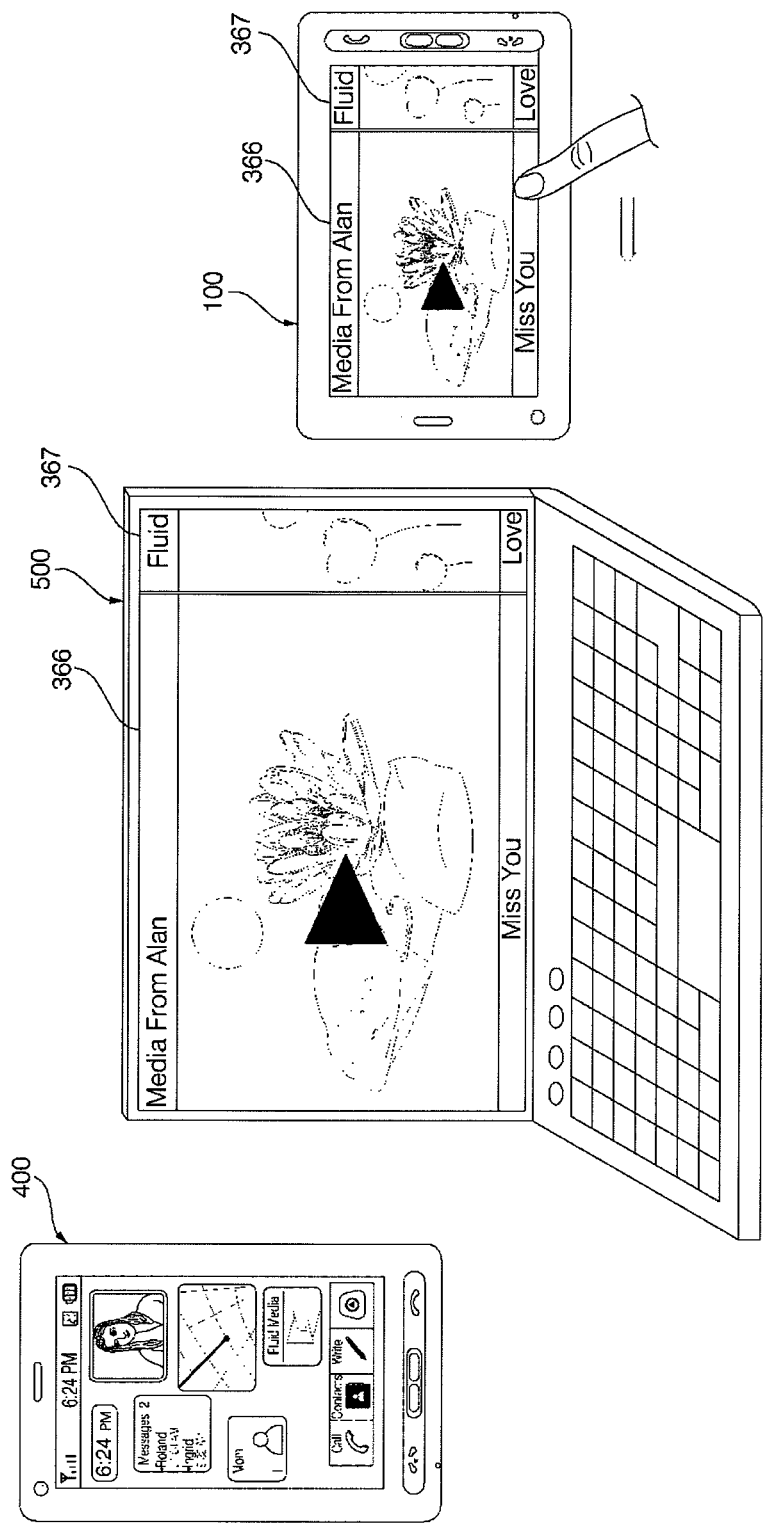

US 8,958,747 B2

MOBILE TERMINAL, MOBILE TERMINAL SYSTEM, AND METHOD FOR CONTROLLING OPERATION OF THE SAME

CROSS-REFERENCE TO RELATED APPLICATION

This application claims the benefit of Korean Application No. 10-2010-0000525, filed Jan. 5, 2010 in the Korean Intellectual Property Office, the disclosure of which is incorporated herein by reference.

BACKGROUND OF THE INVENTION

1. Field of the Invention

The present invention relates to a mobile terminal, a mobile terminal system, and a method for controlling the operation of the same, and more particularly to a method for conveniently transmitting content in a mobile terminal system including mobile terminals and electronic devices.

2. Description of the Related Art

A mobile terminal is a portable device having a function to perform voice and video communication, a function to receive and output information, or a function to store data. As the functionality of the mobile terminal has been diversified, a mobile terminal having various complicated functions such as a function to capture still or moving images (i.e., photographs or videos), a function to reproduce music or video files, a game function, a function to receive broadcasts, and a wireless Internet function has been implemented as an all-in-one multimedia player.

Various novel attempts have been made in terms of hardware or software to achieve more complicated functions of the mobile terminal implemented as a multimedia player. One example is provision of a user interface environment allowing the user to easily and conveniently find and select a desired function. As the mobile terminal is now considered a personal belonging expressing the user's personality, there has been demand for various interface designs such as a double-sided Liquid Crystal Display (LCD), which can be viewed from both sides, or a touch screen.

Mobile terminals can be connected to each other through wired or wireless communication. Users can copy or move content between mobile terminals.

SUMMARY OF THE INVENTION

Therefore, the present invention has been made in view of the above circumstances, and it is an object of the present invention to provide a mobile terminal, a mobile terminal system, and a method for controlling the operation of the same, which provide user interface environments enabling content to be transmitted between at least two mobile terminals.

In accordance with the present invention, the above and other objects can be accomplished by the provision of a method for controlling operation of a first mobile terminal, the method including entering, by the first mobile terminal, a content share mode, detecting, by the first mobile terminal, a second mobile terminal which is in the content share mode, specifying a content transmission format for transmitting content to the second mobile terminal based on the detection result, and transmitting the content to the second mobile terminal according to the specified content transmission format.

In accordance with another aspect of the present invention, there is provided a method for controlling operation of a first mobile terminal, the method including entering, by the first mobile terminal, a content share mode, detecting, by the first mobile terminal, a second mobile terminal which is in the content share mode, transmitting, by the first mobile terminal, a content transmission grant signal and information regarding content, determining whether a command to receive the content has been received from the second mobile terminal, and transmitting the content to the second mobile terminal based on the determination result.

In accordance with another aspect of the present invention, there is provided a method for controlling operation of a first mobile terminal, the method including entering, by the first mobile terminal, a content share mode, receiving, by the first mobile terminal in the content share mode, information regarding content to be transmitted and a content transmission grant request signal from a second mobile terminal that is in the content share mode, displaying on the first mobile terminal the received information regarding the content, determining whether a command to receive the content has been transmitted to the second mobile terminal, and receiving the content from the second mobile terminal.

In accordance with another aspect of the present invention, there is provided a first mobile terminal including a wireless communication unit configured to transmit and to receive signals to and from a second mobile terminal, and a controller configured to, when the first mobile terminal has entered a content share mode, detect the second mobile terminal which is capable of transmitting and receiving signals through the wireless command unit and which is in the content share mode, to specify a content transmission format for transmitting content to the second mobile terminal, and to control the wireless communication unit to transmit the content to the second mobile terminal according to the specified format.

In accordance with another aspect of the present invention, there is provided a first mobile terminal including a wireless communication unit configured to transmit and to receive signals to and from a second mobile terminal, and a controller configure to, when the first mobile terminal has entered a content share mode, detect the second mobile terminal which is capable of transmitting and receiving signals through the wireless command unit and which is in the content share mode, to transmit information regarding content, which is to be transmitted and displayed on the second mobile terminal, to determine whether a command to receive the content has been received from the second mobile terminal, and to control the wireless communication unit to transmit the content to the second mobile terminal.

In accordance with another aspect of the present invention, there is provided a first mobile terminal including a wireless communication unit configured to transmit and to receive signals to and from a third mobile terminal, and a controller configured to, when the first mobile terminal has entered a content share mode, detect a second mobile terminal which is capable of transmitting and receiving signals through the wireless command unit and which is in the content share mode, to receive information regarding content to be transmitted by the third mobile terminal, to display the received information regarding the content, to determine whether a command to receive the content has been transmitted to the second mobile terminal, and to control the wireless communication unit to receive the content transmitted by the second mobile terminal.

According to the present invention, it is possible to conveniently transmit content between mobile terminals that are in a share mode. Before receiving content from a first mobile terminal, a second mobile terminal can display a thumbnail corresponding to the content. The user of the second mobile terminal can check the content that will be received using the thumbnail corresponding to the content. The first and second mobile terminals can provide user interface environments that can intuitively indicate content transmission states. Thus, users can conveniently manage content transmission between at least two mobile terminals.

BRIEF DESCRIPTION OF THE DRAWINGS

The above and other objects, features and other advantages of the present invention will be more clearly understood from the following detailed description taken in conjunction with the accompanying drawings, in which:

FIGS. 4 to 14b are drawings used to explain a method for controlling the operation of a mobile terminal according to embodiments of the present invention in conjunction with screens displayed on a display unit.

DETAILED DESCRIPTION OF THE INVENTION

The embodiments of the present invention will now be described in more detail with reference to the drawings.

A mobile terminal as described in this specification includes a mobile phone, a smart phone, a laptop, a digital broadcast terminal, a Personal Digital Assistant (PDA), a Portable Multimedia Player (PMP), a navigation device, or the like.

The word "module" or "unit", which is added to the end of terms describing components, is merely used for ease of explanation of the present invention and has no specific meaning or function to the components. Thus, the words "module" and "unit" may also be used interchangeably.

Figure 1:
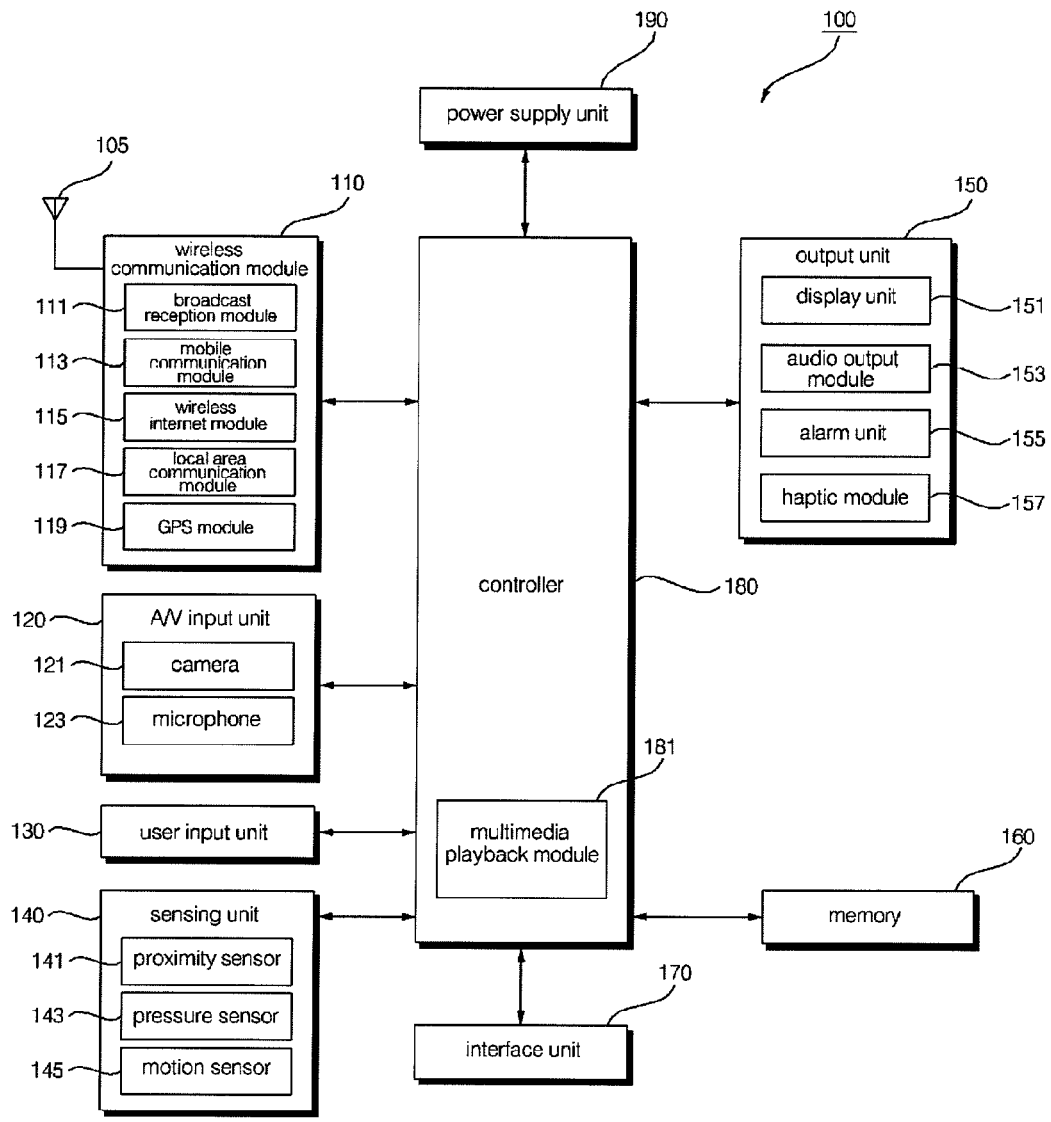
FIG. 1 is a block diagram of a mobile terminal according to an embodiment of the present invention.

<Description of FIG. 1>

FIG. 1 is a block diagram of a mobile terminal according to an embodiment of the present invention. The mobile terminal according to the embodiment of the present invention is described below with reference to FIG. 1, from the viewpoint of functional components thereof.

As shown in FIG. 1, the mobile terminal 100 may include a wireless communication unit 110, an Audio/Video (AV) input unit 120, a user input unit 130, a sensing unit 140, an output unit 150, a memory 160, an interface unit 170, a controller 180, and a power supply unit 190. In actual applications, two or more of these components may be combined into one component or one component may be divided into two or more components as needed. For example, the A/V input unit 120 or the sensing unit 140 may be incorporated into the user input unit 130.

The wireless communication unit 110 may include a broadcast receiving module 111, a mobile communication module 113, a wireless Internet module 115, a local area communication module 117, and a Global Positioning System (GPS) module 119.

The broadcast receiving module 111 receives at least one of a broadcast signal and broadcast-related information from an external broadcast management server through a broadcast channel. The broadcast channel may include a satellite channel, a terrestrial channel, or the like. The broadcast management server may be a server that generates and transmits at least one of a broadcast signal and broadcast-related information or a server that receives and transmits at least one of a broadcast signal and broadcast-related information, which have been previously generated, to a terminal.

The broadcast-related information may be information relating to a broadcast channel, a broadcast program, or a broadcast service provider. The broadcast signal may not only include a TV broadcast signal, a radio broadcast signal, or a data broadcast signal but may also include a broadcast signal generated by incorporating a data broadcast signal into a TV or radio broadcast signal. The broadcast-related information may also be provided through a mobile communication network. In this case, the broadcast-related information may be received by the mobile communication module 113. The broadcast-related information may be provided in various forms. For example, the broadcast-related information may be provided in the form of a Digital Multimedia Broadcasting (DMB) Electronic Program Guide (EPG) or a Digital Video Broadcast-Handheld (DVB-H) Electronic Service Guide (ESG).

The broadcast receiving module 111 receives a broadcast signal using a variety of broadcast systems. Specifically, the broadcast receiving module 111 may receive a digital broadcast signal using a digital broadcast system such as a Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), or Integrated Services Digital Broadcast-Terrestrial (ISDB-T) system. The broadcast receiving module 111 may be configured to be suitable not only for such a digital broadcast system but also for any other broadcast system that provides a broadcast signal. A broadcast signal and/or broadcast-related information received through the broadcast receiving module 111 may be stored in the memory 160.

The mobile communication module 113 transmits and receives a wireless signal to and from at least one of a base station, an external terminal, and a server over a mobile communication network. The wireless signal may include a voice call signal, a video call signal, or various types of data associated with transmission and reception of a text/multimedia message.

The wireless Internet module 115 is an internal or external module for wireless Internet access which may be provided to the mobile terminal 100. The wireless Internet module 115 may use a wireless Internet technology such as Wireless LAN (WLAN) (Wi-Fi), Wireless Broadband (WiBro), World Interoperability for Microwave Access (WiMAX), or High Speed Downlink Packet Access (HSDPA).

The local area communication module 117 is a module for local area communication. Here, Bluetooth, Radio Frequency Identification (RFID), Infrared Data Association (IrDA,), Ultra Wideband (UWB), or ZigBee may be used as a local area communication technology. The GPS module 119 receives location information from multiple GPS satellites.

The A/V input unit 120 is provided to input an audio or video signal and may include a camera 121 and a microphone 123. The camera 121 processes an image frame such as a still image (or photograph) or a moving image (or video) obtained through an image sensor in a video communication mode or an image capture mode. The processed picture frame may be displayed on the display unit 151.

The picture frame processed at the camera 121 may be stored in the memory 160 or may be transmitted to the outside through the wireless communication unit 110. Two more cameras 121 may be provided depending on the configuration of the mobile terminal.

The microphone 123 receives an external audio signal in a voice or video communication mode, a record mode, or a voice recognition mode and processes the same into audio data. In the voice or video communication mode, the processed audio data may be converted into a form transmittable to a mobile communication base station through the mobile communication module 113. A variety of noise removal algorithms may be used to remove noise generated in the course of receiving an external audio signal through the microphone 123.

The user input unit 130 generates key input data corresponding to a key input operation that a user has performed to control the operation of the terminal. The user input unit 130 may include a key pad, a dome switch, a (resistive/capacitive) touchpad, a jog wheel, a jog switch, a finger mouse, or the like. In the case where the touchpad forms a multilayer structure with the display unit 151 that is described later, the touchpad may be referred to as a "touch screen".

The sensing unit 140 detects a current state of the mobile terminal 100 such as whether the mobile terminal 100 is opened or closed, the position of the mobile terminal 100, or whether or not the user is in contact with the mobile terminal 100 and generates a sensing signal for controlling the operation of the mobile terminal 100. The sensing unit 140 may sense whether the mobile terminal 100 is opened or closed when the mobile terminal 100 is a slide phone. The sensing unit 140 may also be responsible for sensing functions associated with whether or not the power supply unit 190 is supplying power or whether or not the interface unit 170 is coupled to an external device.

The sensing unit 140 may include a proximity sensor 141, a pressure sensor 143, and a motion sensor 145. The proximity sensor 141 can detect presence or absence of an object that is approaching or near to the mobile terminal 100 without physical contact. The proximity sensor 141 can detect a close object using change of AC magnetic fields or change of magnetostatic fields or using the rate of change of capacitance. Two or more proximity sensors 141 may be provided depending on the configuration of the mobile terminal.

The pressure sensor 143 can detect both whether or not pressure has been applied to the mobile terminal 100 and the magnitude of the pressure. The pressure sensor 143 may be mounted on the mobile terminal 100 at a portion thereof where there is a need to detect pressure depending on the use environment of the mobile terminal 100. When the pressure sensor 143 is mounted on the display unit 151, the pressure sensor 143 can discriminate between a normal touch input through the display unit 151 and a pressure touch input which applies greater pressure than that of the normal touch input according to a signal output from the pressure sensor 143 to the display unit 151. When pressure has been applied to the display unit 151 through a pressure input touch, the pressure sensor 143 can also determine the magnitude of the pressure applied to the display unit 151 according to the signal output from the pressure sensor 143.

The motion sensor 145 detects the position or movement of the mobile terminal 100 using an acceleration sensor, a gyro sensor, and the like. The acceleration sensor that may be used for the motion sensor 145 is an element which converts acceleration in one direction into an electrical signal and has been widely used along with the development of micro-electromechanical system (MEMS) technologies. There are various types of acceleration sensors including an acceleration sensor for measuring large values of acceleration, which is embedded in an airbag system of a vehicle to detect collision, and an acceleration sensor for measuring small values of acceleration, which recognizes minute movement of a human hand and thus is used as an input means for games or the like. The acceleration sensor is generally constructed by incorporating two or three-axis elements into one package and may need only the z-axis element depending on the use environment. Thus, when there is a need to use an x-axis or y-axis acceleration sensor instead of the z-axis sensor for some reason, the acceleration sensor may be incorporated into a sub-board which is mounted at right angles to a main board.

The gyro sensor is a sensor for measuring angular velocity and can detect the current direction rotated relative to a reference direction.

The output unit 150 is provided to output an audio or video signal or an alarm signal and may include a display unit 151, an audio output module 153, an alarm unit 155, and a vibrating module 157.

The display unit 151 displays information processed in the mobile terminal 100. For example, when the mobile terminal 100 is in a voice or video communication mode, the display unit 151 displays a communication-related User Interface (UI) or Graphical User Interface (GUI). When the mobile terminal 100 is in a video communication mode or an image capture mode, the display unit 151 may individually or simultaneously display captured or received images and may display a corresponding UI or GUI.

In the case where the display unit 151 forms a multilayer structure with the touchpad to construct a touch screen as described above, the display unit 151 may not only be used as an output device but may also be used as an input device. In the case where the display unit 151 constructs a touch screen, the display unit 151 may include a touch screen panel, a touch screen panel controller, or the like. The touch screen panel is a transparent panel externally attached to the mobile terminal 100 and may be connected to an internal bus of the mobile terminal 100. The touch screen panel monitors touches and sends, upon detecting a touch input, corresponding signals to the touch screen panel controller. The touch screen panel controller processes the signals and transmits the resulting data to the controller 180 and the controller 180 then determines whether or not a touch input has occurred and which region of the touch screen has been touched.

The display unit 151 may include electronic paper (e-Paper). The e-Paper is a type of reflective display and has excellent visual characteristics such as high resolution, a wide viewing angle, and a bright white background, similar to conventional paper and ink. The e-Paper may be formed on any substrate such as plastic, metal, or paper and maintains a displayed image after power is turned off and can lengthen battery lifetime of the mobile terminal 100 since it does not require a backlight. The e-Paper may be formed using an electrostatically charged hemispherical twist ball or may be formed using electrophoresis or microcapsules.

The display unit 151 may include at least one of a liquid crystal display, a thin film transistor-liquid crystal display, an organic light-emitting diode, a flexible display, a transparent display, and a 3D display. Two or more display units 151 may be provided depending on the implementation of the mobile terminal 100. For example, both an external display unit (not shown) and an internal display unit (not shown) may be provided to the mobile terminal 100.

The audio output module 153 outputs audio data received from the wireless communication unit 110 or stored in the memory 160 when the mobile terminal 100 is in an incoming call receiving mode (i.e., a ringing mode), a voice or video communication mode, a record mode, a voice recognition mode, or a broadcast receiving mode. The audio output module 153 outputs audio signals associated with functions performed by the mobile terminal 100, for example, an audio signal associated with an incoming call sound (i.e., ringtone) or a message receipt sound. The audio output module 153 may include a speaker, a buzzer, or the like.

The alarm unit 155 outputs a signal notifying the user that an event has occurred in the mobile terminal 100. Examples of the event occurring in the mobile terminal 100 include incoming call reception, message reception, and key signal input. The alarm unit 155 outputs a signal notifying the user of the occurrence of an event in a different form from the audio or video signal. For example, the alarm unit 155 may output the notification signal through vibration. When an incoming call signal is received or when a message is received, the alarm unit 155 may output a signal indicating the reception of the incoming call signal or the message. When a key signal is input, the alarm unit 155 may output a signal as a feedback to the key signal input. The user can perceive the event occurrence through the signal output from the alarm unit 155. Of course, the signal indicating the event occurrence may also be output through the display unit 151 or the audio output module 153.

The haptic module 157 generates a variety of tactile effects that are sensible by the user. A typical example of the tactile effect generated by the haptic module 157 is vibration. In the case where the haptic module 157 generates vibration as a tactile effect, the haptic module 157 may change the intensity and pattern of generated vibration, may combine different vibrations and output the combined vibration, and may also sequentially output different vibrations.

In addition to vibration, the haptic module 157 may generate various tactile effects such as a stimulus effect by an arrangement of pins that move perpendicular to the touched skin surface, a stimulus effect by air blowing or suction through an air outlet or inlet, a stimulus effect through brushing of the skin surface, a stimulus effect through contact with an electrode, a stimulus effect using electrostatic force, and a stimulus effect through reproduction of thermal (cool/warm) sensation using an endothermic or exothermic element. The haptic module 157 may be implemented so as to allow the user to perceive such effects not only through direct tactile sensation but also through kinesthetic sensation of fingers, hands, or the like of the user. Two or more vibration modules 157 may be provided depending on the mode of implementation of the mobile terminal 100.

The memory 160 may store a program for processing and control by the controller 180 and may function to temporarily store input or output data items (for example, a phonebook, messages, still images, and moving images).

The memory 160 may include a storage medium of at least one of a variety of types including a flash memory type, a hard disk type, a multimedia card micro type, a card memory type (for example, SD or XD memory), RAM, and ROM. The mobile terminal 100 may utilize cloud storage that performs a storage function of the memory 160 over the Internet.

The interface unit 170 functions to interface with all external devices connected to the mobile terminal 100. Examples of the external devices connected to the mobile terminal 100 include a wired/wireless headset, an external battery charger, a wired/wireless data port, a memory card, a card socket such as an SIM/UIM card socket, an audio Input/Output (110) terminal, a video I/O terminal, and an earphone. The interface unit 170 may receive power or data from such an external device and provide the same to each internal component of the mobile terminal 100 and may transmit internal data of the mobile terminal 100 to the external device.

When the mobile terminal 100 is connected to an external cradle, the interface unit 170 may be used as a channel through which the connected cradle supplies power to the mobile terminal 100 or a channel through which a variety of command signals input to the cradle by the user are transferred to the mobile terminal 100.

The controller 180 generally controls the operation of each component to control the overall operation of the mobile terminal 100. For example, the controller 180 performs control and processing associated with voice communication, data communication, video communication, and the like. The controller 180 may include a multimedia playback module 181 for multimedia reproduction. The multimedia playback module 181 may be implemented by hardware in the controller 180 or may be implemented by software separately from the controller 180.

Under control of the controller 180, the power supply unit 190 receives external power or internal power and supplies power required for operation to each component.

The mobile terminal 100 may be constructed to be operable in any of a variety of communication systems including a wired/wireless communication system and a satellite-based communication system in which data can be transmitted through frames or packets.

Figure 2:
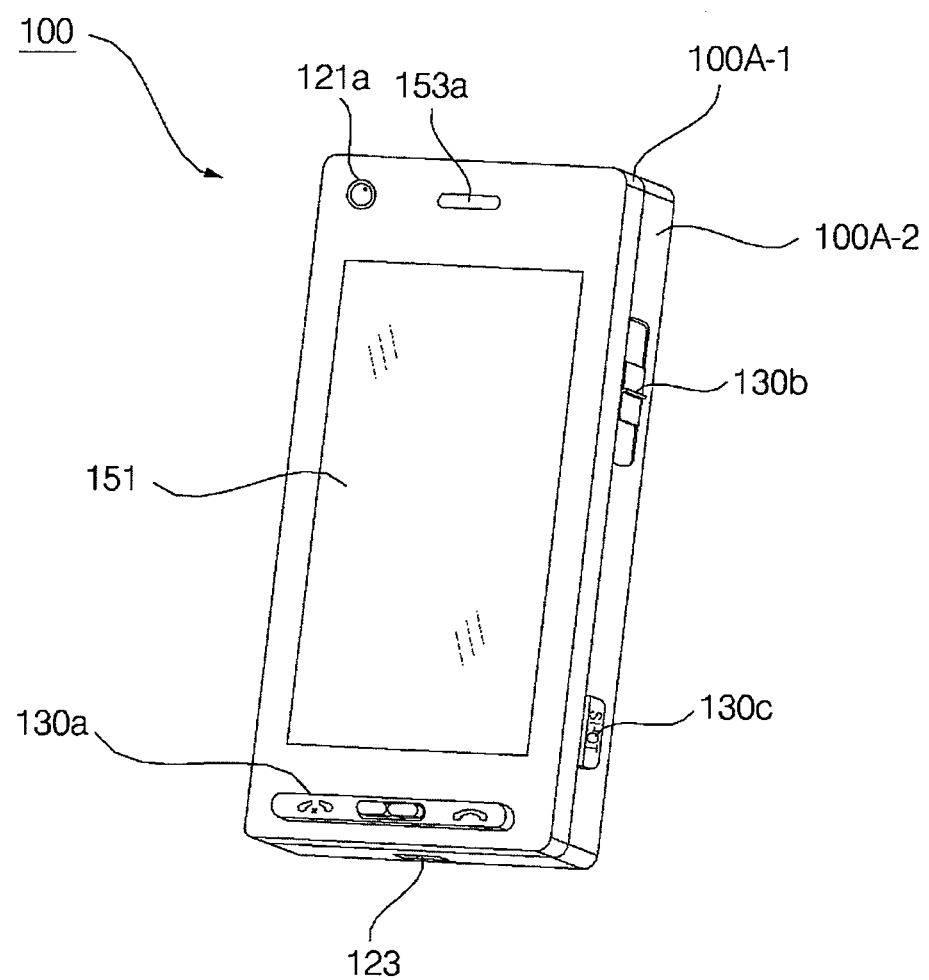
FIG. 2 is a front perspective view of a mobile terminal according to an embodiment of the present invention.
Figure 3:
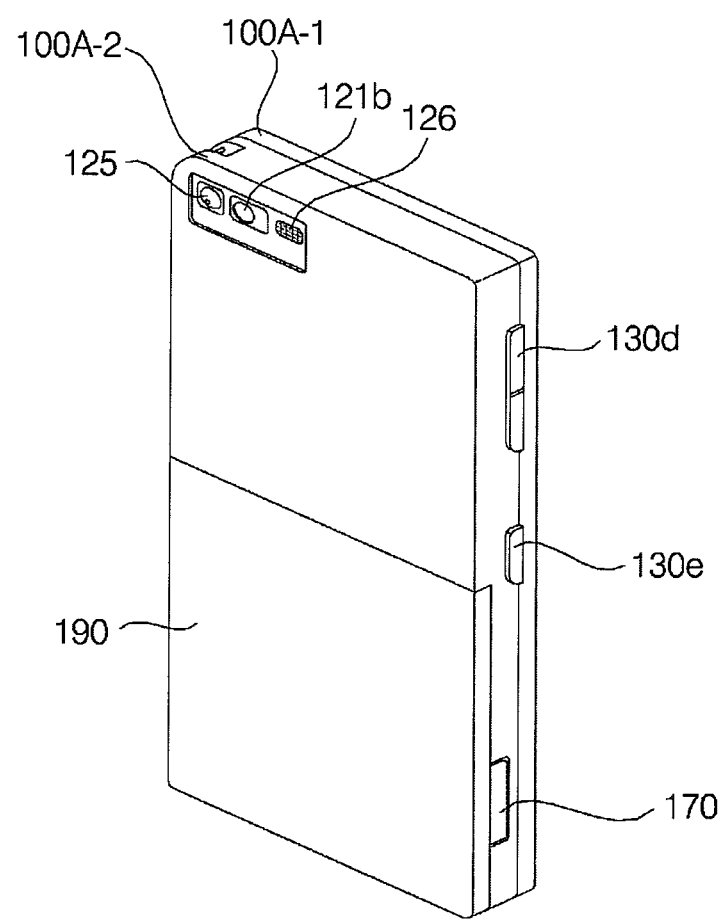
FIG. 3 is a rear perspective view of a mobile terminal according to an embodiment of the present invention.

<Description of FIGS. 2 and 3>

FIG. 2 is a front perspective view of a mobile terminal according to an embodiment of the present invention. As shown in FIG. 2, a case defining the external appearance of the mobile terminal 100 includes a front case 100A-1 and a rear case 100A-2. A variety of electronic parts are provided in a space defined within the front and rear cases 100A-1 and 100A-2. At least one intermediate case may be additionally provided between the front case 100A-1 and the rear case 100A-2. These cases may be formed through synthetic resin injection molding may be formed of a metal material such as stainless steel (STS) or titanium (Ti).

A display unit 151, a first audio output module 153a, a first camera 121a, and a first user input unit 130a may be arranged in a main body of the mobile terminal 100, specifically, in the front case 100A-1. A second user input unit 130b, a third user input unit 130c, and a microphone 123 may be arranged on a side surface of the rear case 100A-2.

The display unit 151 includes a Liquid Crystal Display (LCD), Organic Light Emitting Diodes (OLED), or the like to visually express information. A touchpad may be formed in a layered structure overlapping the display unit 151 such that the display unit 151 operates as a touch screen allowing the user to input information through touching.

The first audio output module 153a may be implemented in a receiver or speaker form. The first camera 121a may be implemented to be suitable for capturing a still or moving image of the user or the like. The microphone 123 may be implemented in a form suitable for receiving sound such as user voice.

The first to third user input units 130a, 130b, and 130c may be collectively referred to as a user input unit 130. The user input unit 130 may be of any type, provided that the user input unit 130 is operated in a tactile manner such that it is operated through tactile interaction with the user.

For example, the user input unit 130 may be implemented as a dome switch or a touchpad that can receive a command or information through a push or touch operation by the user. The user input unit 130 may also be implemented as a jog wheel or a joystick. In terms of functionality, the first user input unit 130a allows the user to input a command such as start, end, or send and the second user input unit 130b allows the user to select an operating mode of the mobile terminal 100. The third user input unit 130c may function as a hot key for activating a special function of the mobile terminal 100.

FIG. 3 is a rear perspective view of the mobile terminal shown in FIG. 2. As shown in FIG. 3, a fourth user input unit 130d, a fifth user input unit 130e, and an interface unit 170 may be provided on a side surface of the rear case 100A-2 and a second camera 121b may be additionally provided on a rear surface of the rear case 100A-2.

The second camera 121b may have a capture direction substantially opposite to that of the first camera 121a and have a different pixel resolution from that of the first camera 121a. For example, the first camera 121a preferably has a low pixel resolution such that it is suitable to capture and transmit an image of the face of the user, for example, in the case of video communication and the second camera 121b preferably has a high pixel resolution since, when the user captures a general object using the second camera 121b, the user generally does not immediately transmit the captured image.

A mirror 125 and a flash lamp 126 may be additionally provided on the mobile terminal 100 near the second camera 121b. The mirror 125 allows the user to view their face or the like when capturing themselves using the second camera 121b (i.e., in the case of self-shooting). The flash lamp 126 shines light toward a subject when the subject is captured using the second camera 121b.

A second audio output module (not shown) may be additionally provided on the rear case 100A-2. The second audio output module may implement a stereo function in conjunction with the first audio output module 153a and may be used to perform voice or video communication in a speakerphone mode.

In addition to an antenna for communication, an antenna for receiving broadcast signals (not shown) may be provided on the rear case 100A-2 at a portion thereof. Each antenna may be mounted to be retractable from the rear case 100A-2.

The interface unit 170 is a channel through which the mobile terminal 100 can exchange data or the like with an external device. For example, the interface unit 170 may be at least one of a connection terminal for wired or wireless connection to an earphone, a port for local area communication, and power supply terminals for supplying power to the mobile terminal 100. The interface unit 170 may be a card socket for receiving an external card such as a Subscriber Identification Module (SIM), a User Identity Module (UIM), or a memory card for information storage.

A power supply unit 190 for supplying power to the mobile terminal 100 is provided on the rear case 100A-2. The power supply unit 190 is, for example, a rechargeable battery which is detachably mounted to the rear case 100A-2 for the purpose of recharging or the like. Although the above description has been given with reference to an example where the second camera 121b is provided on the rear case 100A-2, the present invention is not limited to this example. When the second camera 121b is not provided, the first camera 121a may be formed to be rotatable so as to enable capturing in the same capture direction as that of the second camera 121b.

Figure 4:
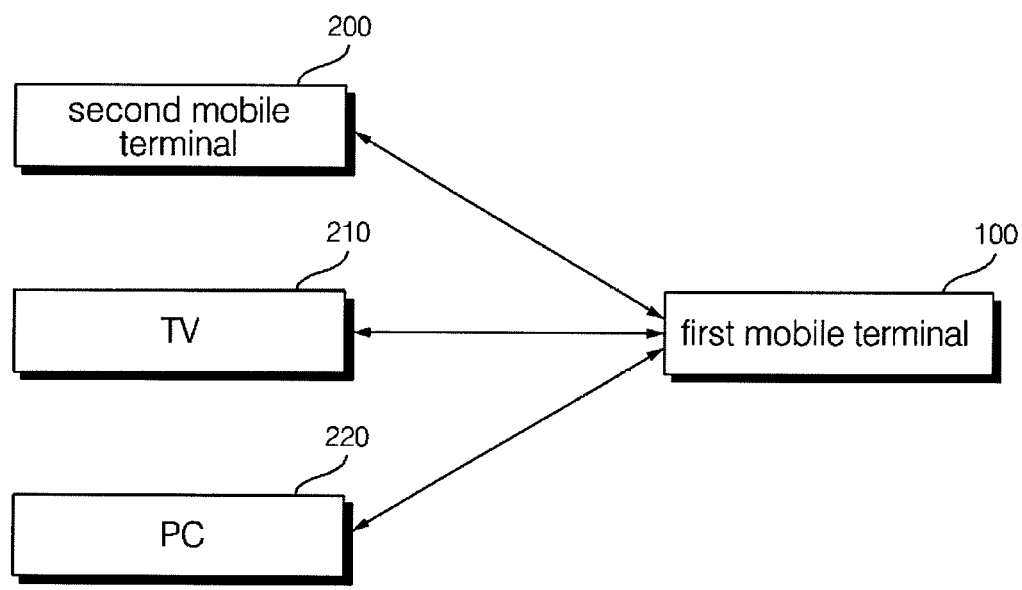

<Description of FIG. 4>

FIG. 4 is a block diagram of a mobile terminal system according to an embodiment of the present invention.

The mobile terminal according to this embodiment may be connected to another mobile terminal by wire or wirelessly to transmit and receive signals to and from the mobile terminal. The mobile terminal may be a TV or PC. Specifically, a first mobile terminal 100 according to this embodiment may transmit and receive signals to and from a second mobile terminal 200. The first mobile terminal 100 may also transmit and receive signals to and from a TV 210 and a PC 220 which are examples of the mobile terminal. The following is a description of a method through which the first mobile terminal 100 and the second mobile terminal 200 transmit and receive content to and from each other according to this embodiment.

The content transmitting and receiving method according to this embodiment may also be applied to other mobile terminals.

The first mobile terminal 100 may enter a content share mode in which the first mobile terminal 100 can transmit and receive content to and from the second mobile terminal 200. The content share mode may be a mode in which the first mobile terminal 100 can transmit content to a mobile terminal present within a predetermined distance or can receive content from a mobile terminal present within a predetermined distance.

In this embodiment, the first mobile terminal 100 that has entered the content share mode may transmit information regarding content for transmission to the second mobile terminal 200 that has entered the content share mode. The first mobile terminal 100 may also transmit a content transmission grant request signal to the second mobile terminal 200 before transmitting content to the second mobile terminal 200. The content transmission grant request signal may include information regarding the content.

The second mobile terminal 200 may display the information regarding the content included in the content transmission grant request signal. A user of the second mobile terminal 200 may input a content reception command to the second mobile terminal 200 after checking the information regarding the content. When it is determined that the content reception command has been input, the second mobile terminal 200 may transmit a content transmission grant signal to the first mobile terminal 100. When the second mobile terminal 200 has transmitted the content transmission grant signal, the first mobile terminal 100 determines that a content reception command has been input to the second mobile terminal 200. Thus, the first mobile terminal 100 can transmit content to the second mobile terminal 200.

The first mobile terminal 100 may transmit content to the second mobile terminal 200 according to at least two transmission formats. In an example, the first mobile terminal 100 may transmit content to the second mobile terminal 200 according to a show transmission format. The content transmitted according to the show transmission format is not stored in the second mobile terminal 200. The user of the first mobile terminal 100 can control the content even after the first mobile terminal 100 transmits the content to the second mobile terminal 200 according to the show transmission format.

In an example, when the first mobile terminal 100 has transmitted content currently displayed on the display unit 151 of the first mobile terminal 100 to the second mobile terminal 200 according to the show transmission format, the second mobile terminal 200 may display the content received from the first mobile terminal 100. When the user of the first mobile terminal 100 has moved, edited, played back, or stopped playback of the content displayed on the display unit 151 of the first mobile terminal 100, the state of the content displayed on the second mobile terminal 200 is changed in the same manner as that displayed on the first mobile terminal 100. That is, the display state of the content displayed on the second mobile terminal 200 is changed according to the display state of the content displayed on the first mobile terminal 100.

The content transmitted according to the show transmission format can be controlled solely by the first mobile terminal 100 after the content is transmitted to the second mobile terminal 200. The content transmitted to the second mobile terminal 200 cannot be stored in the second mobile terminal 200. Thus, the user of the first mobile terminal 100 can share content, which can be controlled solely by the user of the first mobile terminal 100 due to copyright, with the user of the second mobile terminal 200.

The content that the first mobile terminal 100 has transmitted to the second mobile terminal 200 according to the show transmission format may be deleted from the second mobile terminal 200 when it is determined that the second mobile terminal 200 has been released from the content share mode or that the distance between the first mobile terminal 100 and the second mobile terminal 200 has exceeded the predetermined distance.

The first mobile terminal 100 may also transmit content according to a give transmission format. The content transmitted according to the give transmission format may be controlled by the second mobile terminal 200.

After transmitting first content currently displayed on the display unit 151, the user of the first mobile terminal 100 may control the first mobile terminal 100 to display second content on the display unit 151. In the case where first content has been transmitted according to the show transmission format, the first content cannot be displayed on the second mobile terminal 200 when the first content is no longer displayed on the first mobile terminal 100.

In the case where the first content has been transmitted according to the give transmission format, the first content can continue to be displayed on the second mobile terminal 200 even when the first content is no longer displayed on the first mobile terminal 100. The user of the second mobile terminal 200 can independently control (for example, move, edit, play back, or stop playback of) the first content. The user of the second mobile terminal 200 can also store the first content.

The user of the first mobile terminal 100 can also input a content transmission command to the first mobile terminal 100. Upon determining that the content transmission command has been input, the first mobile terminal 100 may transmit information regarding content, which is to be transmitted to the second mobile terminal 200, to the second mobile terminal 200. The information regarding the content may be included in a content transmission grant request signal to be transmitted to the second mobile terminal 200 as described above. When a content reception command has been input to the second mobile terminal 200, the second mobile terminal 200 may transmit a content transmission grant signal to the first mobile terminal 100. The content transmission grant signal includes the content reception command that has been input to the second mobile terminal 200. Accordingly, the first mobile terminal 100 determines that the content reception command has been input to the second mobile terminal 200 and can thus transmit the content to the first mobile terminal 100.

In the case where a content transmission command has been input to the first mobile terminal 100, the first mobile terminal 100 determines a content transmission format for transmitting the content. The content transmission format may be set by default. The content transmission format may be set for each item of content. In an example, content, which has been marked as content that should be protected by copyright, may be set to be transmitted according to the show transmission format. The user may also select a content transmission format. In this case, the first mobile terminal 100 transmits content to the second mobile terminal 200 according to the content transmission format selected by the user.

In this embodiment, an icon corresponding to a content transmission command may be provided according to the content transmission format. In this case, the user of the first mobile terminal 100 may input a content transmission command to the first mobile terminal 100 by dragging content, an item corresponding to the content, or an image corresponding to the content displayed on the display unit 151 onto the icon corresponding to the content transmission command. The verb "drag" used in this case will also be referred to as "push".

In this embodiment in which content may be transmitted according to at least two transmission formats, the display unit 151 of the first mobile terminal 100 may display an icon corresponding to the show transmission format and an icon corresponding to the give transmission format. If the user drags an item corresponding to content or an image corresponding to content onto the icon corresponding to the show transmission format, the first mobile terminal 100 may transmit information regarding the content to the second mobile terminal 200 according to the show transmission format. If the user drags an item corresponding to content or an image corresponding to content onto the icon corresponding to the give transmission format, the first mobile terminal 100 may transmit information regarding the content to the second mobile terminal 200 according to the give transmission format.

The information regarding the content transmitted by the first mobile terminal 100 may be information regarding a thumbnail corresponding to the content. The first mobile terminal 100 may transmit a content transmission grant request signal including the information regarding the content such as the information regarding the thumbnail to the second mobile terminal 200. The second mobile terminal 200 may display the information regarding the content included in the content transmission grant request signal transmitted by the first mobile terminal 100 on a display unit of the second mobile terminal 200. Through the information regarding the content displayed on the second mobile terminal 200, the user of the second mobile terminal 200 may check the content that the first mobile terminal 100 desires to transmit to the second mobile terminal 200.

In the case where the information regarding the content is information regarding a thumbnail corresponding to the content, the display unit of the second mobile terminal 200 may display the thumbnail of the content that the first mobile terminal 100 desires to transmit. The user of the second mobile terminal 200 may touch the thumbnail displayed on the display unit of the second mobile terminal 200 or may drag the thumbnail to another region on the display unit. The verb "drag" used in this case will also be referred to as "pull". In this case, the second mobile terminal 200 may determine that a content reception command has been input. Accordingly, the second mobile terminal 200 may transmit a content transmission grant signal to the first mobile terminal 100.

In the case where the user of the second mobile terminal 200 does not input a content reception command to the second mobile terminal 200 within a predetermined time, the second mobile terminal 200 may remove the content thumbnail displayed on the display unit. In addition, in the case where the user of the second mobile terminal 200 does not transmit a content transmission grant signal to the first mobile terminal 100 within a predetermined time, the first mobile terminal 100 may stop attempting to transmit content to the second mobile terminal 200.

In the case where the user of the second mobile terminal 200 is away, the second mobile terminal 200 may display information regarding the time at which the first mobile terminal 100 has attempted to transmit content on the display unit of the second mobile terminal 200. That is, if a content reception command is not input to the second mobile terminal 200 during a predetermined time, the second mobile terminal 200 may remove the content thumbnail and display, on the display unit of the second mobile terminal 200, information such as the time at which the content thumbnail was displayed and information regarding the first mobile terminal 100 that has provided the content thumbnail. This allows the user of the second mobile terminal 200 to confirm that the first mobile terminal 100 attempted to transmit the content.

The user of the second mobile terminal 200 may input a content reject command (i.e., a command not to receive content) to the second mobile terminal 200. In an example, the user of the second mobile terminal 200 may input a content reject command to the second mobile terminal 200 by moving the second mobile terminal 200 in a predetermined direction or by dragging the content thumbnail toward the outside of the display unit on which the content is displayed.

When a content reject command has been input to the second mobile terminal 200, the second mobile terminal 200 may transmit a content transmission reject signal to the first mobile terminal 100. The first mobile terminal 100 may stop attempting to transmit the content upon receiving the content transmission reject signal transmitted from the second mobile terminal 200.

The first mobile terminal 100 determines that a content reception command has been input to the second mobile terminal 200 upon receiving the content transmission grant signal transmitted by the second mobile terminal 200. The first mobile terminal 100 may transmit content to the second mobile terminal 200 according to a specific transmission format. When transmission of the content from the first mobile terminal 100 to the second mobile terminal 200 is completed, the first mobile terminal 100 and the second mobile terminal 200 may display the transmitted content in a full screen mode. This allows the user to confirm that content transmission has been completed.

Content transmitted according to the show transmission format is displayed in a floating state on the second mobile terminal 200. That is, the content is displayed on the display unit of the second mobile terminal 200 so as to appear to be floating on the screen. Thus, the floating content is removed from the display unit of the second mobile terminal 200 when the first mobile terminal 100 is more than a predetermined distance away from the second mobile terminal 200 or when playback of the content on the first mobile terminal 100 is stopped.

The content transmitted according to the give transmission format is displayed in a sunken state on the second mobile terminal 200. Specifically, the content is displayed on the display unit of the second mobile terminal 200 so as to appear to be fixed to the screen. Thus, the sunken content may continue to be displayed on the display unit of the second mobile terminal 200 even when the first mobile terminal 100 is more than a predetermined distance away from the second mobile terminal 200 or when playback of the content on the first mobile terminal 100 is stopped.

The user of the second mobile terminal 200 may input a sunken content storage command to the second mobile terminal 200. When the content storage command has been input, the second mobile terminal 200 may store the sunken content in a memory of the second mobile terminal 200 or the like.

The user of the first mobile terminal 100 may register the second mobile terminal 200 as a trusted device. The first mobile terminal 100 may also be registered as a trusted device in the second mobile terminal 200. In this case, the first mobile terminal 100 may transmit content to the second mobile terminal 200 without transmitting a content transmission grant request signal to the second mobile terminal 200 or without receiving a content transmission grant signal transmitted from the second mobile terminal 200.

In this case, when the user of the first mobile terminal 100 pushes content displayed on the display unit 151 of the first mobile terminal 100, an item corresponding to the content, or an image corresponding to the content onto the icon corresponding to the transmission command, the first mobile terminal 100 transmits the content to the second mobile terminal 200. The content pushed to the second mobile terminal 200 may be displayed in a full screen mode on the second mobile terminal 200.

The user of the first mobile terminal 100 may register the second mobile terminal 200 as a trusted device of the first mobile terminal 100. The user of the second mobile terminal 200 may also register the first mobile terminal 100 as a trusted device of the second mobile terminal 200. In addition, the first mobile terminal 100 may register the second mobile terminal 200, which has transmitted a content transmission grant signal received by the first mobile terminal 100, as a trusted device. The second mobile terminal 200 may register the first mobile terminal 100, which has transmitted a content transmission grant signal received by the second mobile terminal 200, as a trusted device.

The first mobile terminal 100 which is in the content share mode may transmit a content transmission grant request signal to a second mobile terminal 200 which is within a predetermined distance among mobile terminals which are in the content share mode. When a mobile terminal registered as a trusted device of the first mobile terminal 100 is within a predetermined distance, the first mobile terminal 100 may transmit content to the trusted device without the step of transmitting a content transmission grant request signal. In addition, when a mobile terminal registered as a trusted device of the second mobile terminal 200 is within a predetermined distance, the second mobile terminal 200 may receive content transmitted by the trusted device even when the trusted device has not transmitted a content transmission grant request signal.

In the mobile terminal system according to this embodiment, a mobile terminal may transmit and receive signals according to a WiFi protocol. Before transmitting content, the first mobile terminal 100 and the second mobile terminal 200 are subjected to the handshake step at which the mobile terminals transmit and receive a content transmission grant request signal and a content transmission grant signal as described above. Examples of the wireless communication protocol in which signals can be transmitted and received at the handshake step and the actual content transmission step include not only WiFi but also RFID, NFC, and IR communication protocols. In the mobile terminal system according to this embodiment, signals may be transmitted and received according to a wireless communication protocol determined in consideration of the distance between mobile terminals or positions of mobile terminals.

Figure 5:
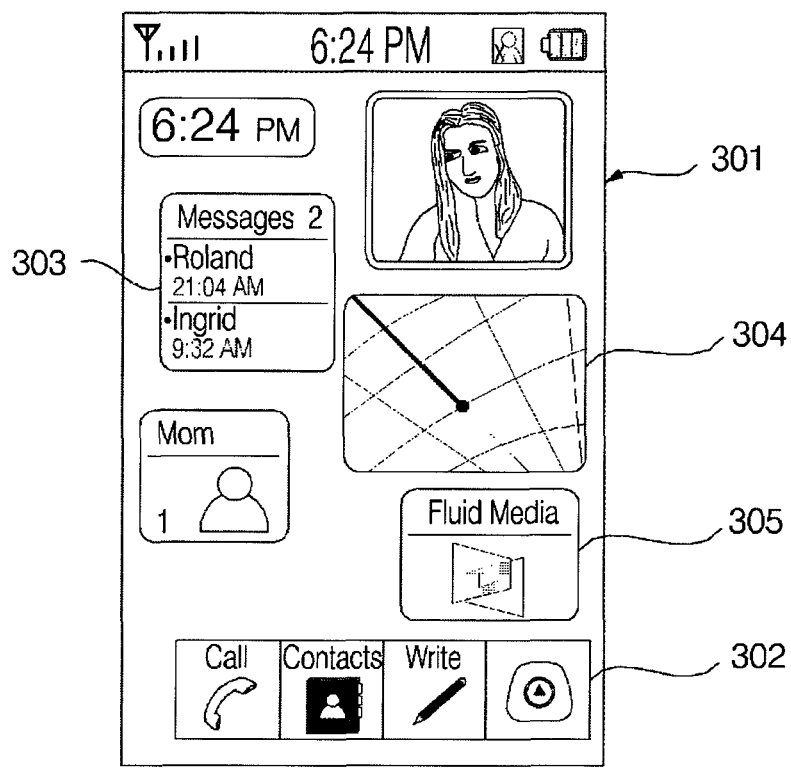

<Description of FIGS. 5 and 6>

FIG. 5 illustrates a screen displayed on the mobile terminal 100 according to an embodiment of the present invention. The mobile terminal 100 of this embodiment may be a handheld device having a function to perform voice or video communication with another mobile terminal through a wireless communication protocol.

A screen 301 displayed on the mobile terminal 100 of this embodiment may include a menu icon 302 corresponding to a command to allow control of the mobile terminal 100, a message widget 303 indicating information regarding a message transmitted to the mobile terminal 100, a position notification widget 304 indicating information regarding a current position of the mobile terminal 100, and a content share mode notification widget 305 indicating whether or not the mobile terminal 100 is currently in the content share mode.

In this embodiment, the mobile terminal 100 that has entered the content share mode may transmit content to a second mobile terminal that is in the content share mode among mobile terminals that are within a predetermined distance. Content transmitted between mobile terminals that are in the content share mode may be referred to as "fluid media". Through the content share mode notification widget 305 displayed on the screen 301 of the mobile terminal 100, the user can check whether or not the mobile terminal 100 has entered the content share mode in which it is possible to transmit and receive fluid media.

Figure 6A:
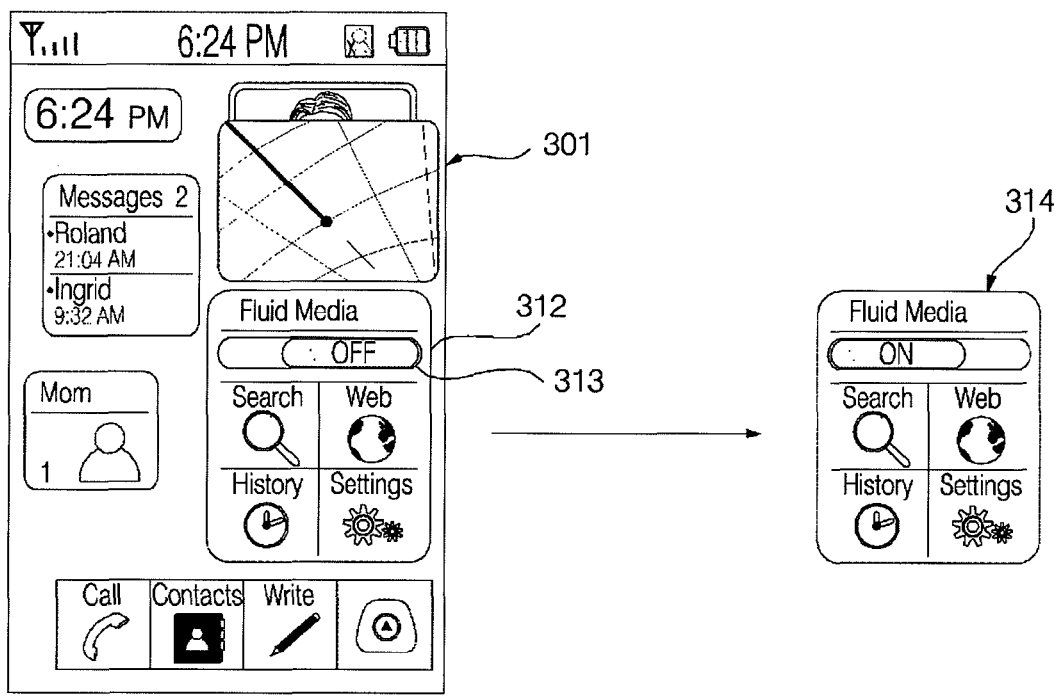

When the user of the mobile terminal 100 has touched the content share mode notification widget 305 included in a background screen 301, the background screen 301 of the mobile terminal 100 may be changed as shown in FIG. 6a.

The background screen 301 of the mobile terminal 100 shown in FIG. 6a includes a widget 312 that allows change of the mode of the mobile terminal 100. The mode change widget 312 includes an object 313 that allows input of a mode change command. The user may cause the mobile terminal 100 to enter the content share mode by dragging the object 313.

When the user drags the object 313 corresponding to the mode change command to the left side after touching the object 313, text displayed on the object 313 is changed from "off" to "on". The mode change widget 314 shown at the right side of an arrow in FIG. 6a includes the object 313 on which the changed text "on" is displayed. Through the display state of the object 313, the user can confirm that the mode change command has been input to the mobile terminal 100.

Figure 6B:
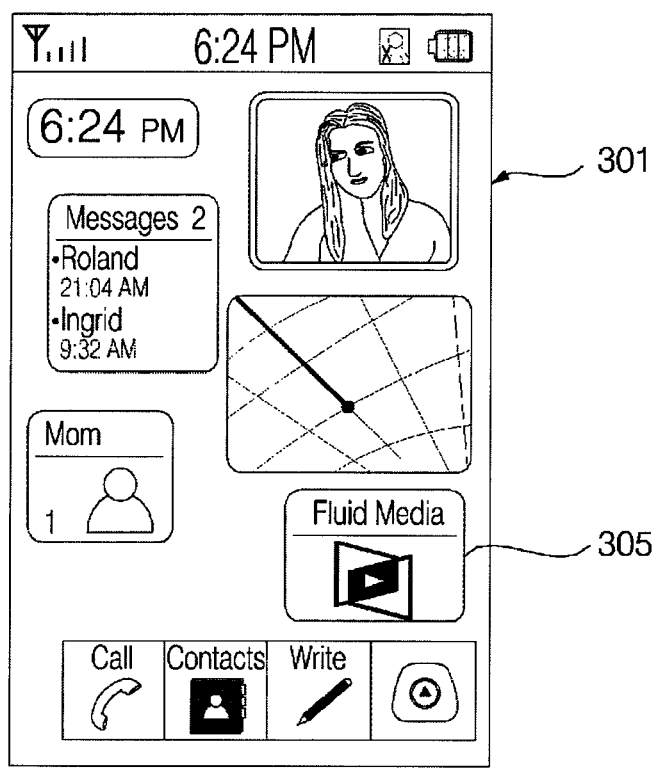

A background screen 315 of the mobile terminal 100 shown in FIG. 6b includes the share mode notification widget 305 whose display state has been changed. In this embodiment, when the mobile terminal has entered the share mode, the share mode notification widget 305 may be deepened in color (or darkened) or may be brightened. Through the share mode notification widget 305 included in the background screen 315 shown in FIG. 6b, the user can confirm that the mode of the mobile terminal 100 is currently in the content share mode.

<Description of FIGS. 7 and 8>

FIGS. 7 and 8 illustrate screens displayed on the mobile terminal 100 when a content transmission command has been input to the mobile terminal 100 which is in the content share mode. In the mobile terminal 100 of this embodiment, the display unit 151 may be constructed of a touch screen. The user may input a command to the mobile terminal 100 by touching the display unit 151. When the display unit 151 is not a touch screen, the user may input a command to the mobile terminal 100 using a remote control device that can control the mobile terminal 100.

Figure 7A:
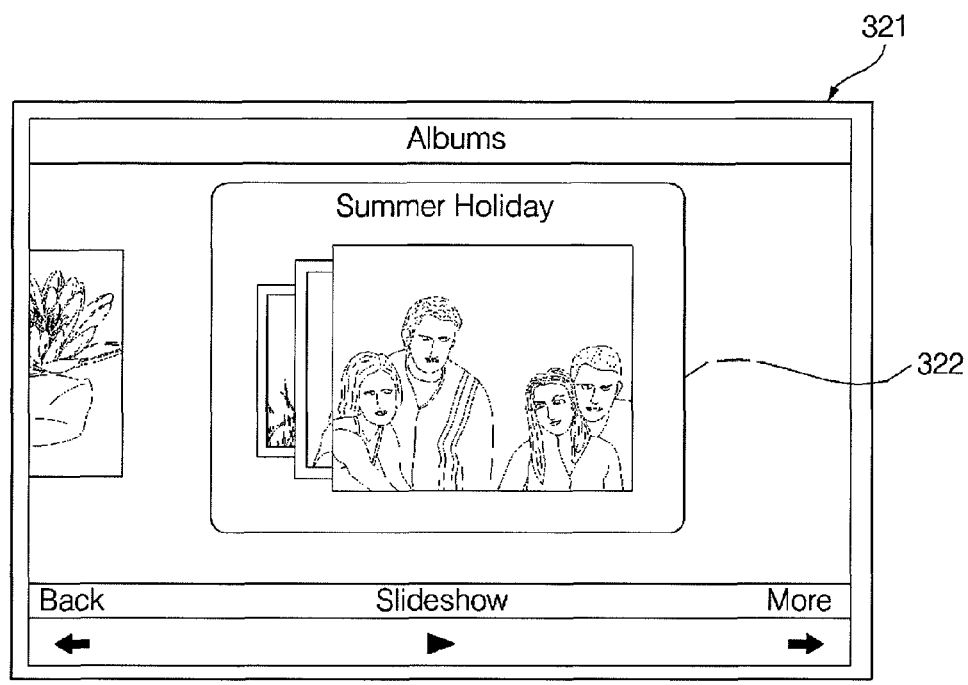

As shown in FIG. 7a, a thumbnail 322 corresponding to content may be displayed on the mobile terminal 100. In this embodiment, the thumbnail 322 is stored in a folder that is named "Summer Holiday" and corresponds to content corresponding to photographs taken during a summer holiday.

When the user of the mobile terminal 100 has touched the thumbnail 322, objects displayed on the background screen 321 other than the thumbnail 322 are faded out. Thus, the user can confirm that the thumbnail 322 has been selected.

Figure 7B:
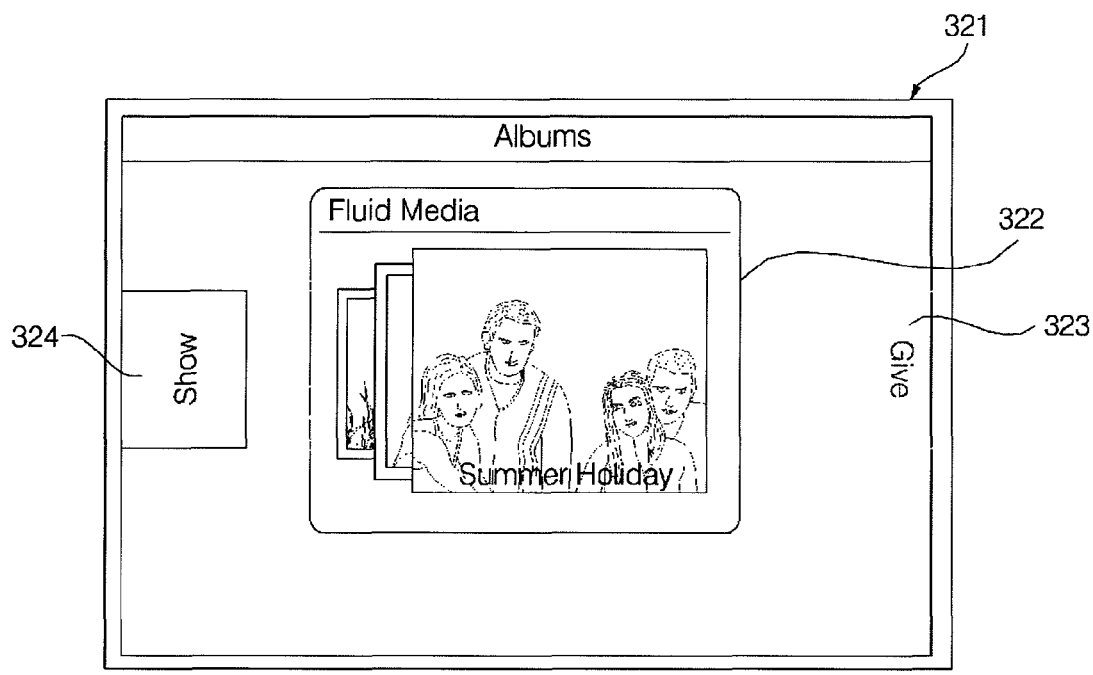

As shown in FIG. 7b, when the thumbnail 322 has been selected, the mobile terminal 100 displays icons 323 and 324 corresponding to a content transmission command on the display unit 151. In this embodiment, the icons 323 and 324 displayed on the display unit 151 correspond to a command that allows transmission of content corresponding to the selected thumbnail 322 according to the show transmission format or the give transmission format.

The mobile terminal 100 highlights the icon 324 located at the side to which the user drags (or pushes) the selected thumbnail 322 among the two icons 323 and 324 and fades out the other icon 323. Thus, the user can know that content corresponding to the thumbnail 322 dragged (or pushed) by the user will be transmitted to another mobile terminal according to the give transmission format.

As shown in FIG. 7b, the mobile terminal 100 may display text "Fluid Media" on the selected thumbnail 322. Thus, the user can confirm that the content corresponding to the selected thumbnail 322 is fluid media to be transmitted to another mobile terminal.

Figure 7C:
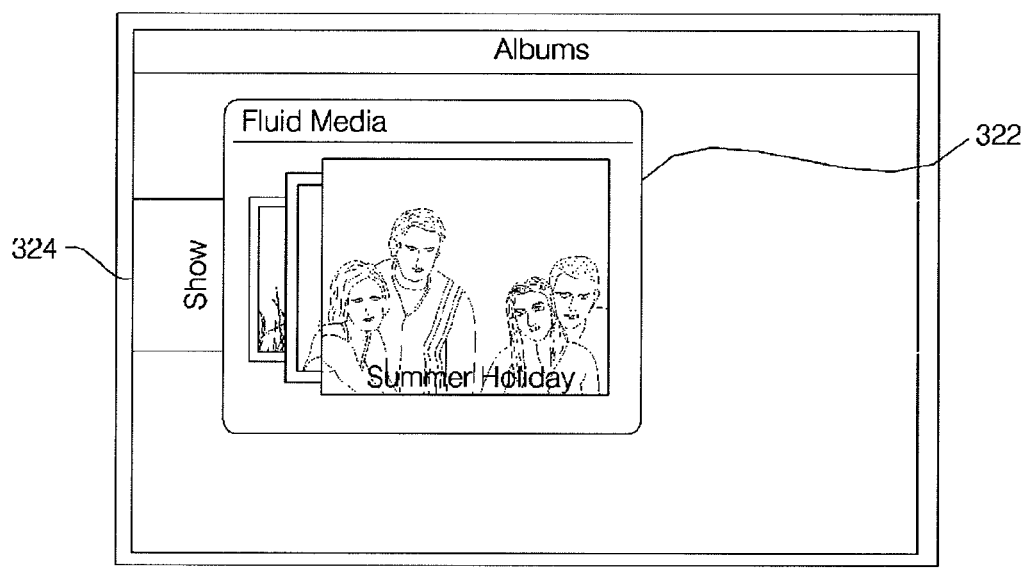
Figure 8A:
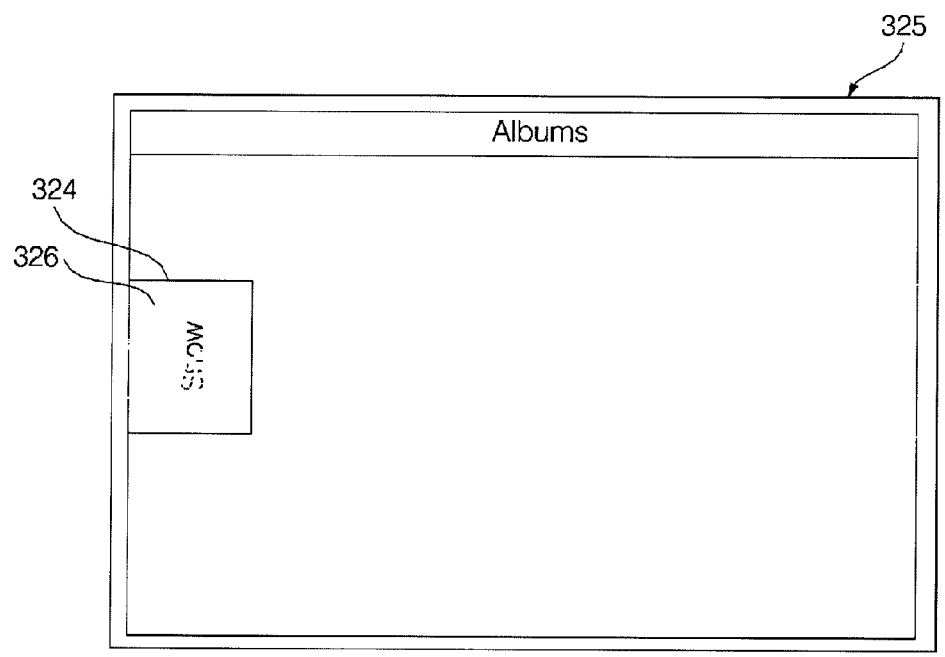

When the selected thumbnail 322 is dragged (pushed) onto the content transmission command icon 324 corresponding to the give transmission format as shown in FIG. 7c, the screen displayed on the mobile terminal 100 is changed as shown in FIG. 8a. In this case, objects other than the icon 324 that allows the user to input a command to transmit content according to the give transmission format are faded out on a screen 331 of the display unit 151 of the mobile terminal 100. Thus, the user can confirm that the command to transmit content according to the give transmission format has been input to the mobile terminal 100.

In addition, the mobile terminal 100 may display an object 326 corresponding to a thumbnail corresponding to content for transmission on the content transmission command icon 324 corresponding to the give transmission format. Thus, the user can check the content for transmission according to the give transmission format.

Figure 8B:
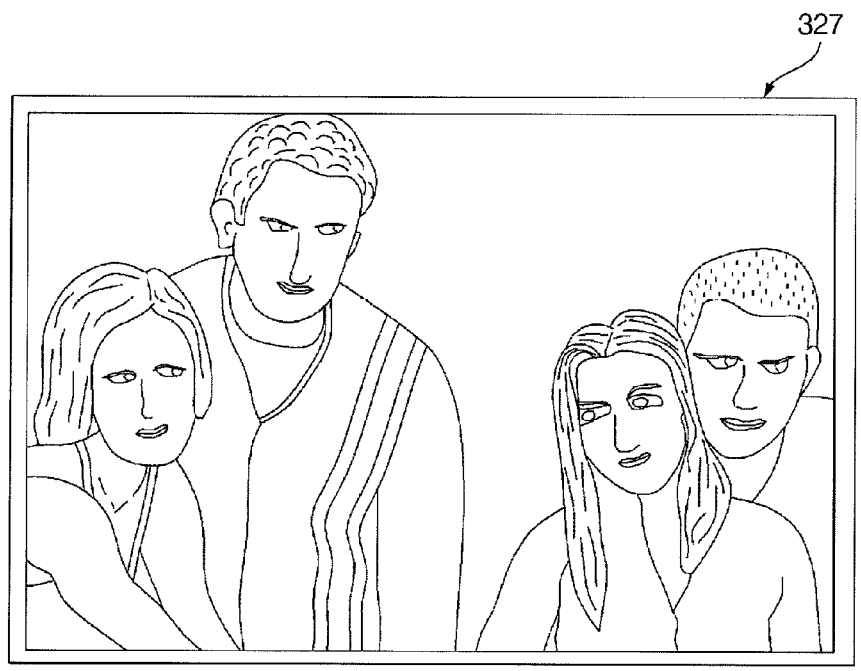

FIG. 8b illustrates a screen 327 displayed on the display unit 151 of the mobile terminal 100 after completion of transmission according to the give transmission format. As shown in FIG. 8b, the mobile terminal 100 may display the content on the screen 327 in a full screen mode after the content has been completely transmitted. Thus, the user of the mobile terminal 100 may confirm that the content has been transmitted.

<Description of FIG. 9>

Figure 9A:
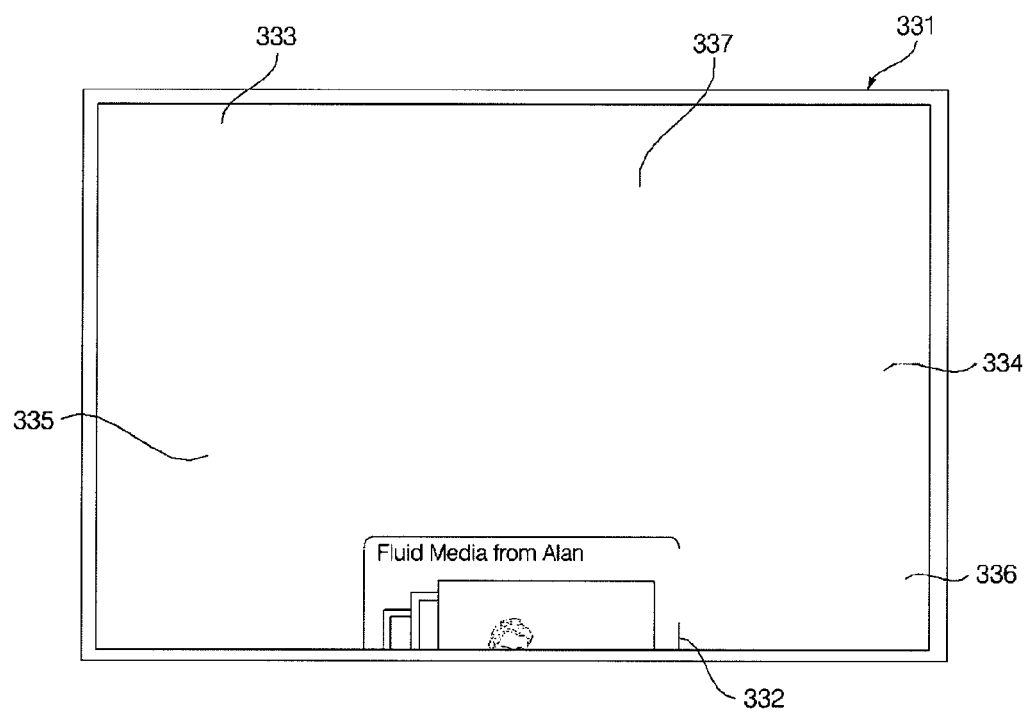
Figure 9B:
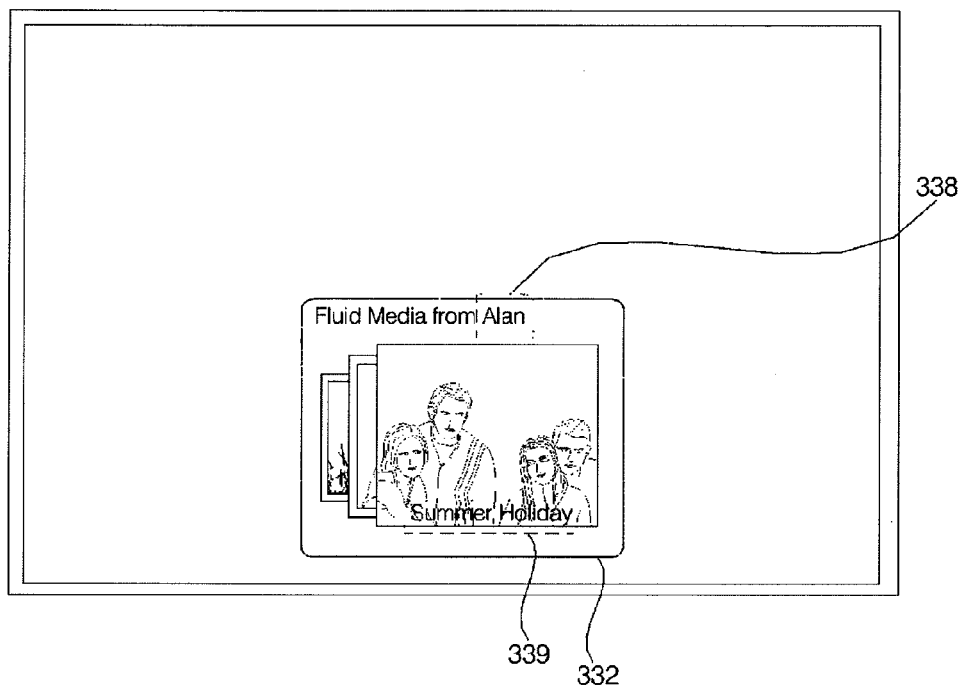
Figure 9C:

FIGS. 9a to 9c illustrate screens displayed on the mobile terminal 100 that receives content according to a method for controlling the operation of a mobile terminal system according to the present invention. The mobile terminal 100 of this embodiment may be a mobile terminal that can receive a broadcast signal and output an image based on the received broadcast signal. The mobile terminal 100 of this embodiment may be connected to a network such as the Internet. The mobile terminal 100 may display a message included in a signal received through the network. The mobile terminal 100 of this embodiment may be connected to a telephone network. The user of the mobile terminal 100 may perform voice or video communication with a counterpart using the mobile terminal 100.

The mobile terminal 100 that has entered the content share mode may receive content transmitted by a third mobile terminal that is in the content share mode. In the case where the third mobile terminal has been registered as a trusted device in the mobile terminal 100 or where the mobile terminal 100 has been registered as a trusted device in the third mobile terminal, the mobile terminal 100 and the third mobile terminal that are in the content share mode may transmit content without the handshake step.

In the case where the third mobile terminal has not been registered as a trusted device in the mobile terminal 100 or where the mobile terminal 100 has not been registered as a trusted device in the third mobile terminal, the mobile terminal 100 and the third mobile terminal that are in the content share mode may transmit content after the handshake step. The handshake step is a process in which mobile terminals transmit and receive a content transmission grant request signal and a content transmission grant signal or a content transmission reject signal as described above.

FIG. 9a illustrates a screen 331 displayed on the display unit 151 of the mobile terminal 100 in the case where a third mobile terminal transmits a content transmission grant request signal to the mobile terminal 100.

The third mobile terminal may transmit a content transmission grant request signal including information regarding content, which is to be transmitted to the mobile terminal 100, to the mobile terminal 100. In this embodiment, the information regarding the content that is to be transmitted by the third mobile terminal is information regarding a content thumbnail. The mobile terminal 100 may display a thumbnail 332 on the display unit 151 with reference to information regarding the content thumbnail included in the content transmission grant request signal transmitted by the third mobile terminal.

The mobile terminal 100 may display an image based on a broadcast signal or may display a received message. Thus, as shown in FIG. 9a, the screen 331 displayed on the mobile terminal 100 may include a thumbnail 333 of an image based on a broadcast signal, a message list 334, a thumbnail 335 of an image based on a broadcast signal received in a favorite channel registered by the user of the mobile terminal 100, a menu 336 that allows the user to input a command to the mobile terminal 100, and a video window 337 that is currently being played on the mobile terminal 100.

The mobile terminal 100 receives a content transmission grant request signal from the third mobile terminal and then displays a content thumbnail 332 on the display unit 151 and fades out objects included in the screen 331 other than the content thumbnail 332. Thus, the user of the mobile terminal 100 can confirm that the third mobile terminal desires to transmit content corresponding to the content thumbnail 332 to the mobile terminal 100.

As shown in FIG. 9b, the user of the mobile terminal 100 may drag (pull) a content thumbnail 332 toward a center region of the display unit 151. In the case where the display unit 151 is constructed of a touch screen, the user may touch the content thumbnail 332 and then drag the same toward the center region of the display unit 151. In addition, the user of the mobile terminal 100 may drag (pull) the content thumbnail 332 using a remote control device of the mobile terminal 100.

The content thumbnail 332 may indicate information regarding the third mobile terminal that desires to transmit content. The content thumbnail 332 may also indicate a file name or the like of content that the third mobile terminal desires to transmit.

In an example, the content thumbnail 332 may display a user name 338 of a third mobile terminal, which transmits content, in text. The content thumbnail 332 may also display a folder name 339 of a folder, in which content for transmission is stored, in text. Thus, through the content thumbnail 332, the user of the mobile terminal 100 can check a variety of information regarding content that is to be transmitted.

When the user has selected the content thumbnail 332 by touching the content thumbnail 332 or using a remote control device, the mobile terminal 100 determines that a content reception command has been input. Thus, the mobile terminal 100 transmits a content transmission grant command to the third mobile terminal. When the content transmission grant command has been transmitted to the third mobile terminal, the third mobile terminal transmits content corresponding to the information transmitted at the handshake step to the mobile terminal 100.

FIG. 9c illustrates a screen 340 displayed on the display unit 151 of the mobile terminal 100 that has received the content transmitted by the third mobile terminal. When the mobile terminal 100 has received the content transmitted by the third mobile terminal, the mobile terminal 100 may display the received content on the display unit 151 in a full screen mode as shown in FIG. 9c. Thus, the user of the mobile terminal 100 can check the content transmitted by the third mobile terminal.

<Description of FIG. 10>

Figure 10A:
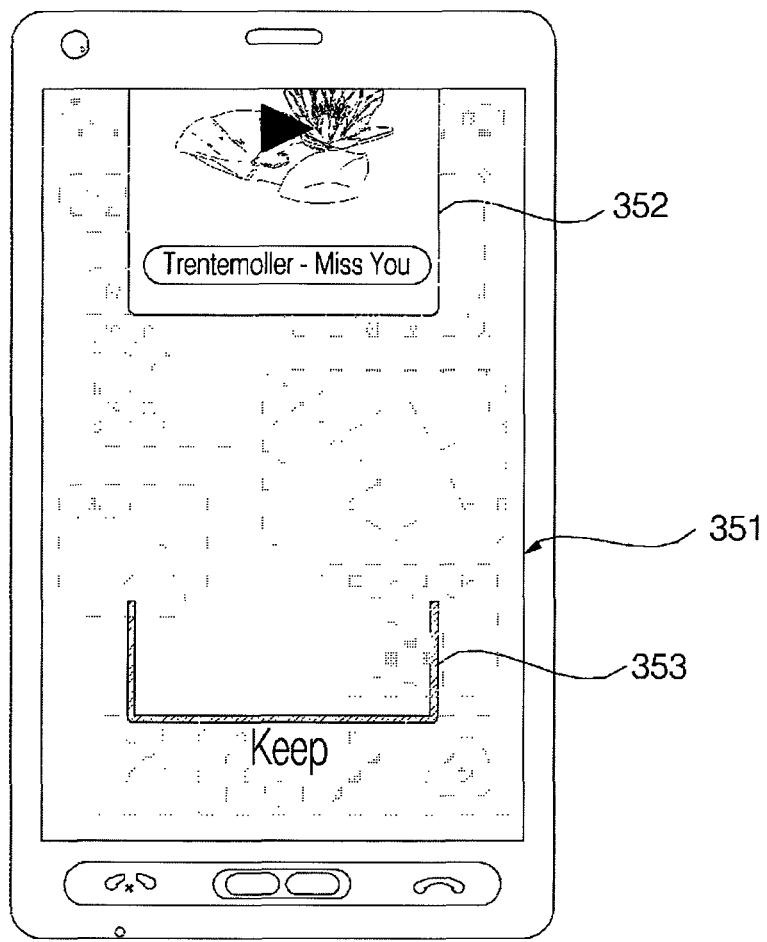
Figure 10B:
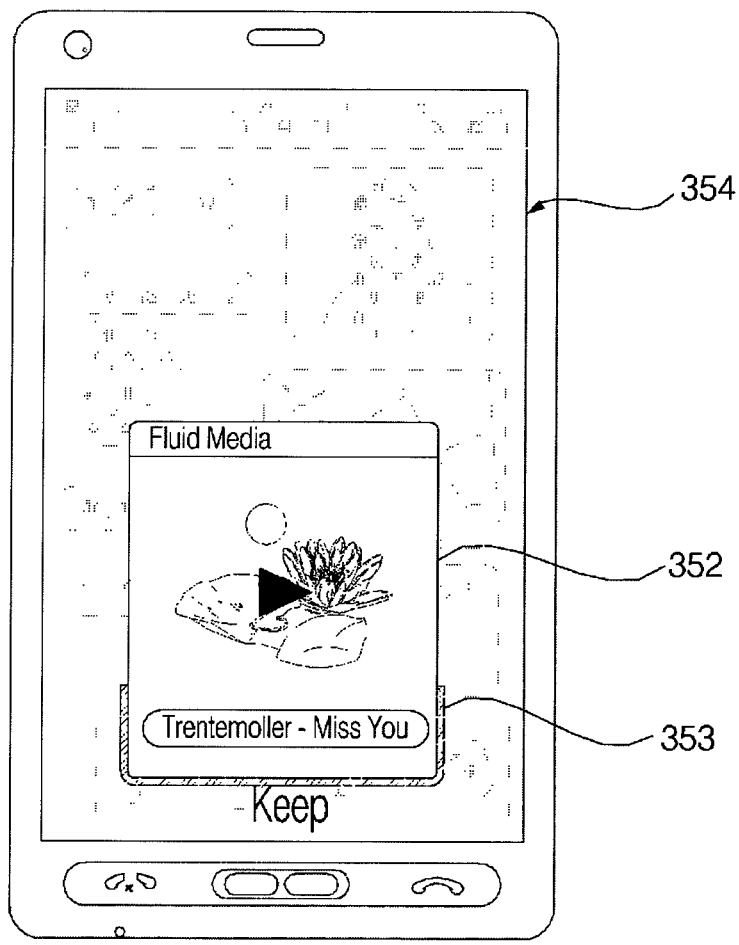

FIGS. 10a and 10b illustrate a screen 351 displayed on the mobile terminal 100 in the case where content transmitted to the mobile terminal 100 is stored. The mobile terminal 100 of this embodiment has a function that allows the user to perform voice communication or video communication with Choi's phone through a telephone network.

A third mobile terminal may transmit a content transmission grant request signal to the mobile terminal 100 that has entered the content share mode. In this case, the mobile terminal 100 may display a content thumbnail 352 with reference to information regarding content included in the content transmission grant request signal as shown in FIG. 10a.

In the case where the content that the third mobile terminal desires to transmit is content for transmission according to the give transmission format, the user of the mobile terminal 100 may store content transmitted by the third mobile terminal. The mobile terminal 100 may display an object 353, which allows the user to input a command to store the content transmitted by the third mobile terminal, on the screen 351.

When the user has dragged (pulled) the content thumbnail 352 onto the object 353, the mobile terminal 100 may determine that a content storage command has been input. In this case, the mobile terminal 100 may store content corresponding to the content thumbnail 352 in a memory of the mobile terminal 100 or the like. FIG. 10b illustrates a screen 354 displayed on the display unit 151 of the mobile terminal 100 when the user has dragged the content thumbnail 352 onto the object 353.

When the content thumbnail 352 has been dragged (pulled) onto the object 353, color of the object 353 displayed on the display unit 151 of the mobile terminal 100 may be changed as shown in FIG. 10b. Through the change of the color of the object 353, the user can confirm that a content storage command has been input to the mobile terminal 100.

<Description of FIGS. 11 and 12>

FIGS. 11 and 12 are drawings used to explain a method for transmitting and receiving content in a mobile terminal system according to an embodiment of the present invention.

Figure 11A:
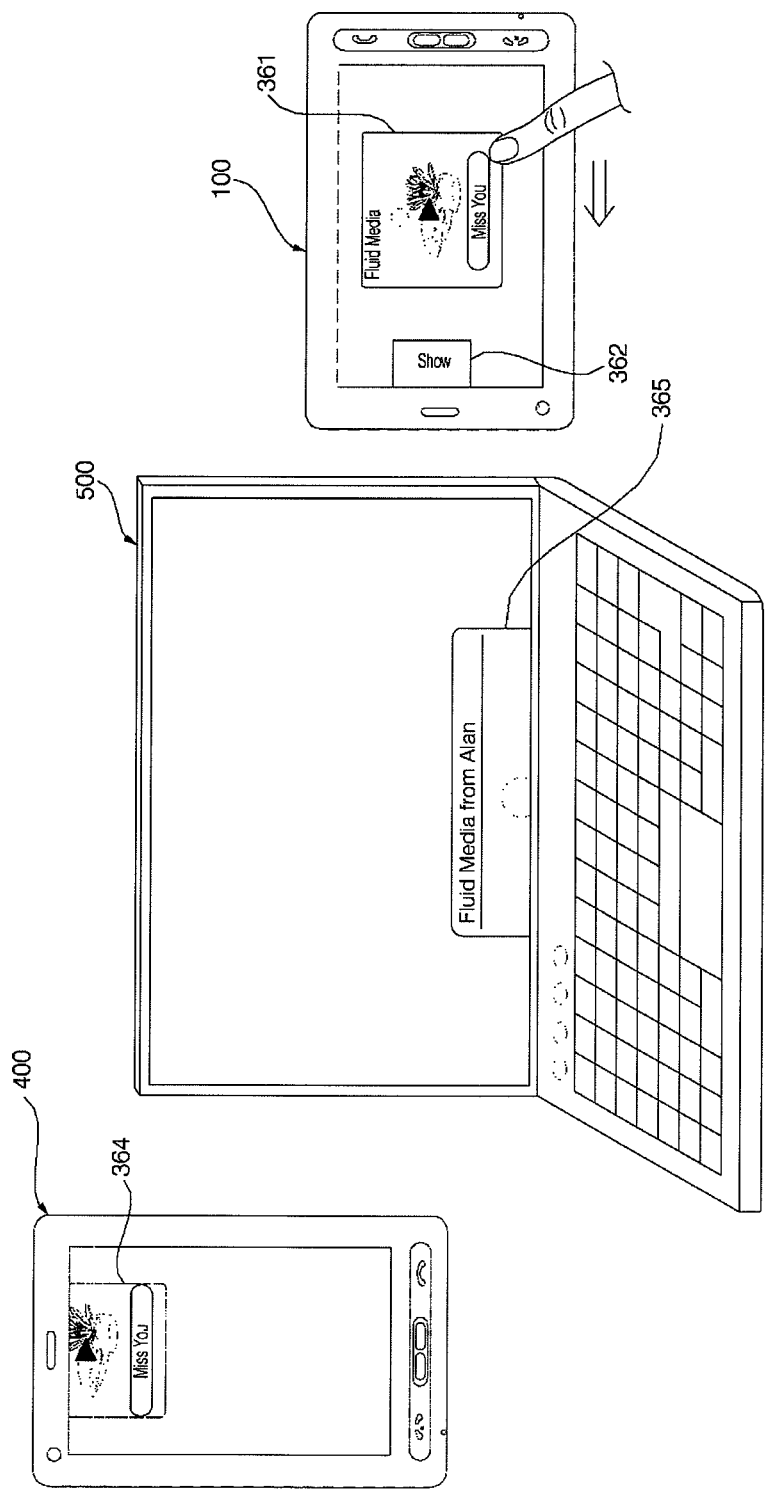

As shown in FIG. 11a, the user of the first mobile terminal 100 may drag (push) a content thumbnail 361 toward an icon 362 that allows the user to input a content transmission command. When the content thumbnail 361 is dragged (pushed) onto the icon 362, the first mobile terminal 100 may transmit a content transmission grant request signal including information regarding content corresponding to the content thumbnail to a fourth mobile terminal 400 and a fifth mobile terminal 500.

In this embodiment, the user of the first mobile terminal 100 pushes the content thumbnail 361 onto the icon 362 corresponding to input of the content transmission command according to the show transmission format so that the content is transmitted according to the show transmission format.

Thus, upon receiving a content transmission grant signal transmitted by the fourth mobile terminal 400 or the fifth mobile terminal 500, the first mobile terminal 100 transmits the content to each of the fourth and fifth mobile terminals according to the show transmission format.

The fourth mobile terminal 400 and the fifth mobile terminal 500 may generate content thumbnails 364 and 365 based on the information regarding the content included in the content transmission grant request signal transmitted by the first mobile terminal 100. The content thumbnails 364 and 365 generated by the fourth mobile terminal 400 and the fifth mobile terminal 500 may be displayed on display units of the mobile terminals 400 and 500, respectively.

The user of each of the mobile terminals 400 and 500 may input a content reject command or a content reception command to the mobile terminal. When the content reject command has been input, each of the mobile terminals 400 and 500 may transmit a content transmission reject signal to the first mobile terminal 100. When the content reception command has been input, each of the mobile terminals 400 and 500 may transmit a content transmission grant signal to the first mobile terminal 100.

Figure 11B:
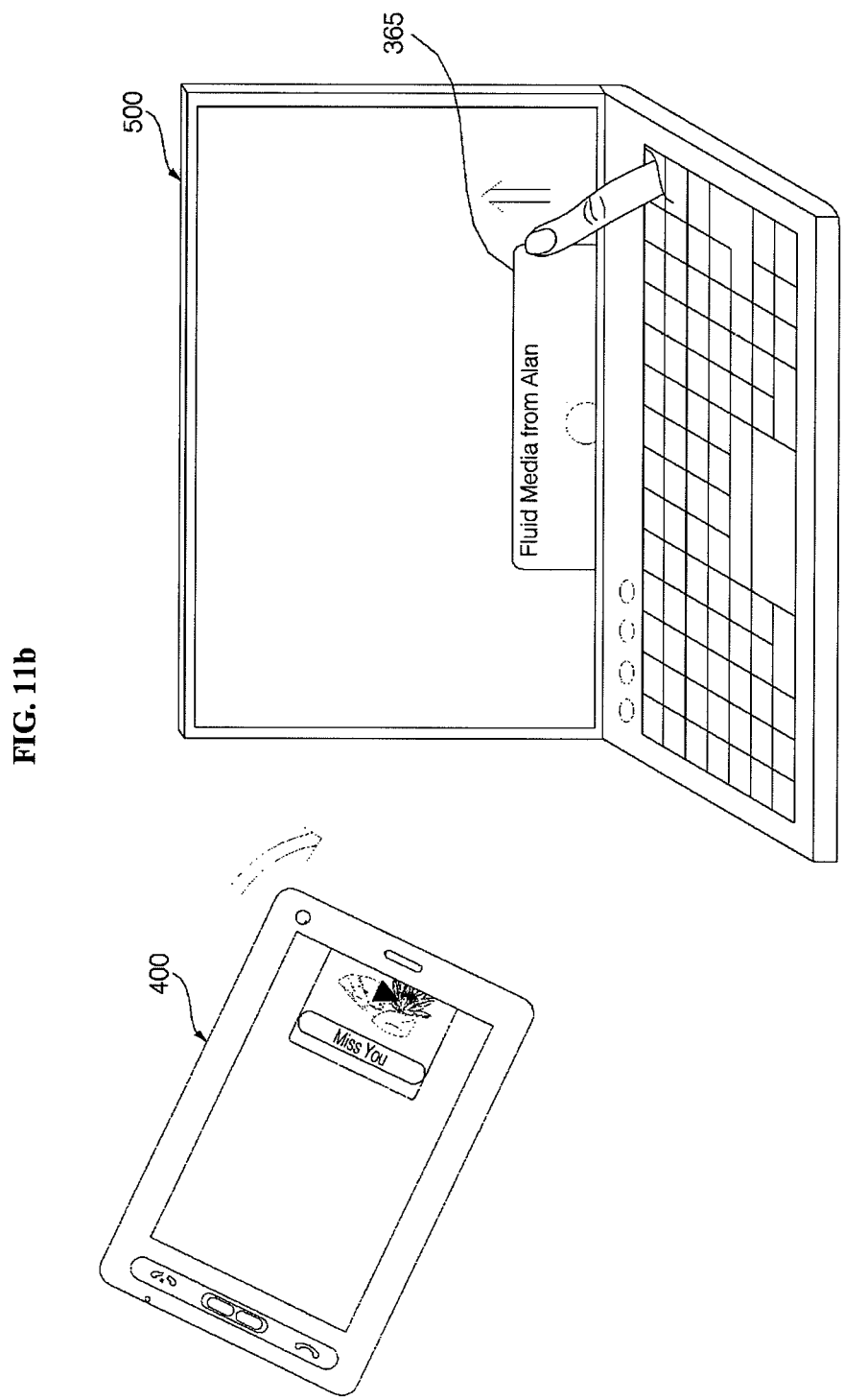

FIG. 11b illustrates the case where the user of the fourth mobile terminal 400 inputs a content reject command to the fourth mobile terminal 400 and the case where the user of the fifth mobile terminal 500 inputs a content reception command to the fifth mobile terminal 500.

The user of the fourth mobile terminal 400 may rotate the fourth mobile terminal 400 in a direction shown by an arrow by a certain angle as shown in FIG. 11b. In this case, the fourth mobile terminal 400 determines that a content reject command has been input to the fourth mobile terminal 400. The fourth mobile terminal 400 transmits a content transmission reject signal to the first mobile terminal 100.

The user of the fifth mobile terminal 500 may drag (pull) a content thumbnail 365 displayed on the fifth mobile terminal 500. In this case, the fifth mobile terminal 500 determines that a content reception command has been input to the fifth mobile terminal 500. The fifth mobile terminal 500 transmits a content transmission grant signal to the first mobile terminal 100.

The first mobile terminal 100 receives the content transmission grant signal transmitted by the fifth mobile terminal 500 and then transmits content to the fifth mobile terminal 500. In addition, the first mobile terminal 100 receives the content transmission reject signal transmitted by the fourth mobile terminal 400 and then stops content transmission to the fourth mobile terminal 400.

FIG. 12a illustrates an example in which content 366 is displayed in a full screen mode on the first mobile terminal 100 and the fifth mobile terminal 500 when the first mobile terminal 100 has transmitted the content to the fifth mobile terminal 500. In this embodiment, the first mobile terminal 100 has transmitted the content 366 to the fifth mobile terminal 500 according to the show transmission format. Thus, the first mobile terminal 100 has a right to control the content 366.

FIG. 12b illustrates the case where the content 366 has been dragged so that second content 367 is displayed on the display unit 151 of the first mobile terminal 100. In the case where the user of the first mobile terminal 100 drags the content 366 displayed on the display unit 151 of the first mobile terminal 100 and second content 367 is thus displayed on the display unit 151, the content 366 displayed on the fifth mobile terminal 500 is also dragged and the second content 367 is thus displayed on the fifth mobile terminal 500.

Content transmitted by the first mobile terminal 100 is not displayed on the fourth mobile terminal 400 to which a content reject command has been input.

<Description of FIGS. 13 and 14>

FIGS. 13 and 14 illustrate a method for transmitting content between the mobile terminal 100 and a sixth mobile terminal 600. In this embodiment, the sixth mobile terminal 600 may have been registered as a trusted device of the mobile terminal 100. In addition, the mobile terminal 100 may have been registered as a trusted device of the sixth mobile terminal 600. The mobile terminal of this embodiment may identify a mobile terminal registered as a trusted device using serial numbers or other identifiers of other mobile terminals present in the mobile terminal system.

Figure 13A:
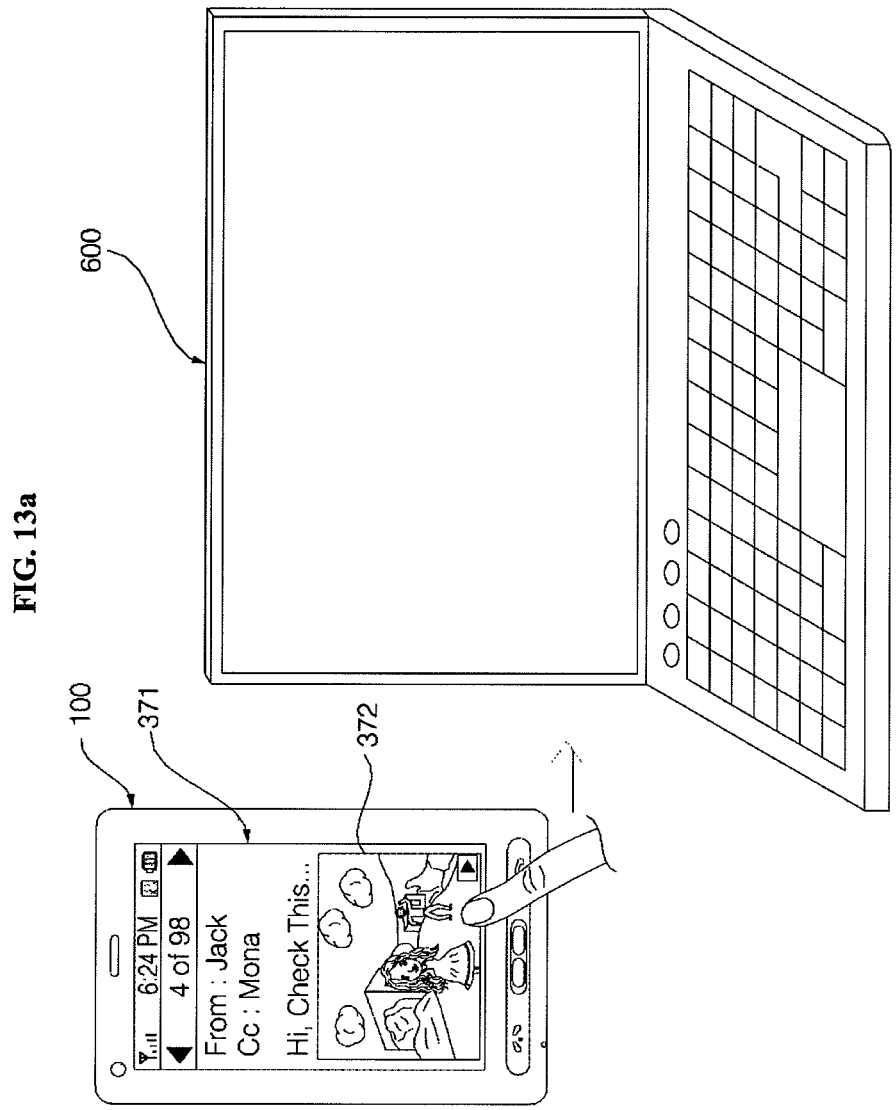

As shown in FIG. 13a, a message or email application may be executed on the mobile terminal 100. In this case, a message or email application screen 371 is displayed on the display unit 151 of the mobile terminal 100. In this embodiment, a message or email displayed on the display unit 151 includes content 372.

The user of the mobile terminal 100 may drag (push) the content 372 in a direction shown by an arrow after touching the content 372. When the user has dragged the content 372, the mobile terminal 100 determines that a content transmission command has been input.

The sixth mobile terminal 600 may be a mobile terminal that has been registered as a trusted device of the mobile terminal 100. The mobile terminal 100 may also be a mobile terminal that has been registered as a trusted device of the sixth mobile terminal 600. Thus, the mobile terminal 100 may transmit content to the sixth mobile terminal 600 without the step of handshake with the sixth mobile terminal 600.

Figure 13B:
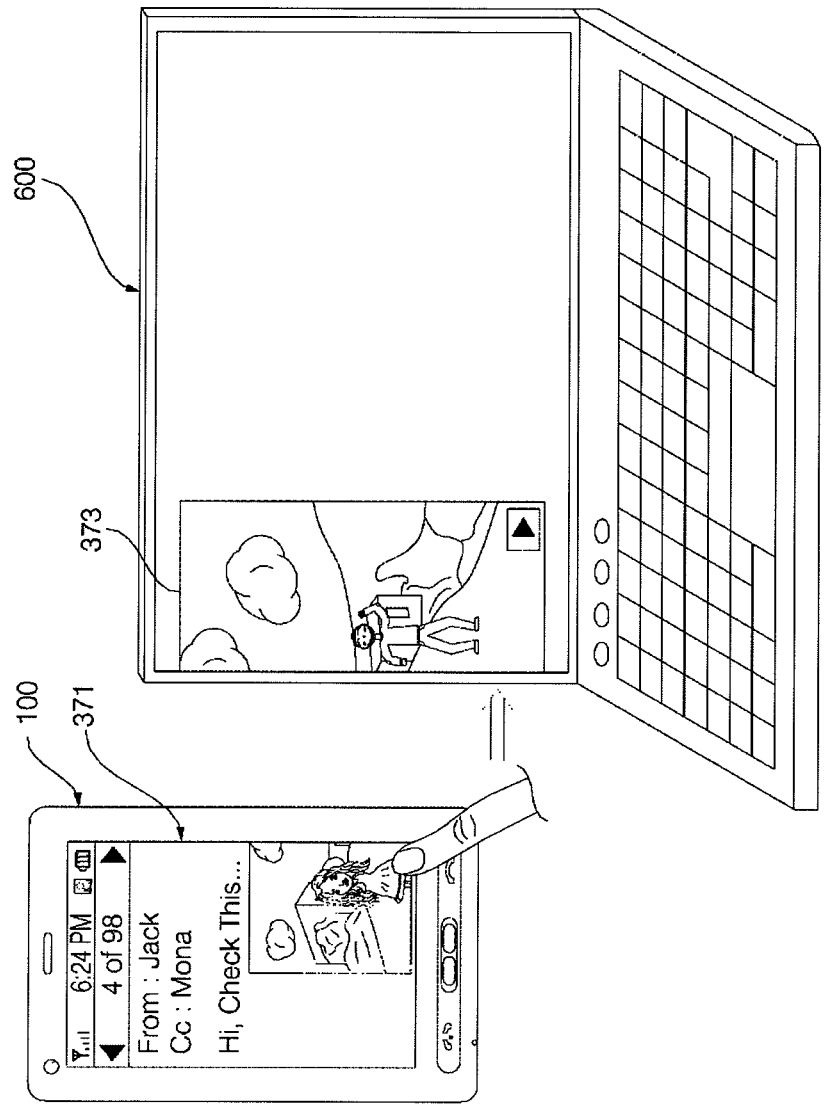

FIG. 13b illustrates screens displayed on the mobile terminal 100 and the sixth mobile terminal 600 in the case where the mobile terminal 100 transmits content to the sixth mobile terminal 600. The sixth mobile terminal 600 may display content 373 that is dragged (pushed) at the mobile terminal 100. The user of the mobile terminal 100 can check the dragged content through the sixth mobile terminal 600.

In the case where the mobile terminal 100 has completely transmitted content to the sixth mobile terminal 600, the sixth mobile terminal 600 may display the transmitted content in a full screen mode. Thus, the user can confirm that content transmission to the sixth mobile terminal 600 has been completed. The sixth mobile terminal 600 may reproduce the completely transmitted content.

Figure 14A:
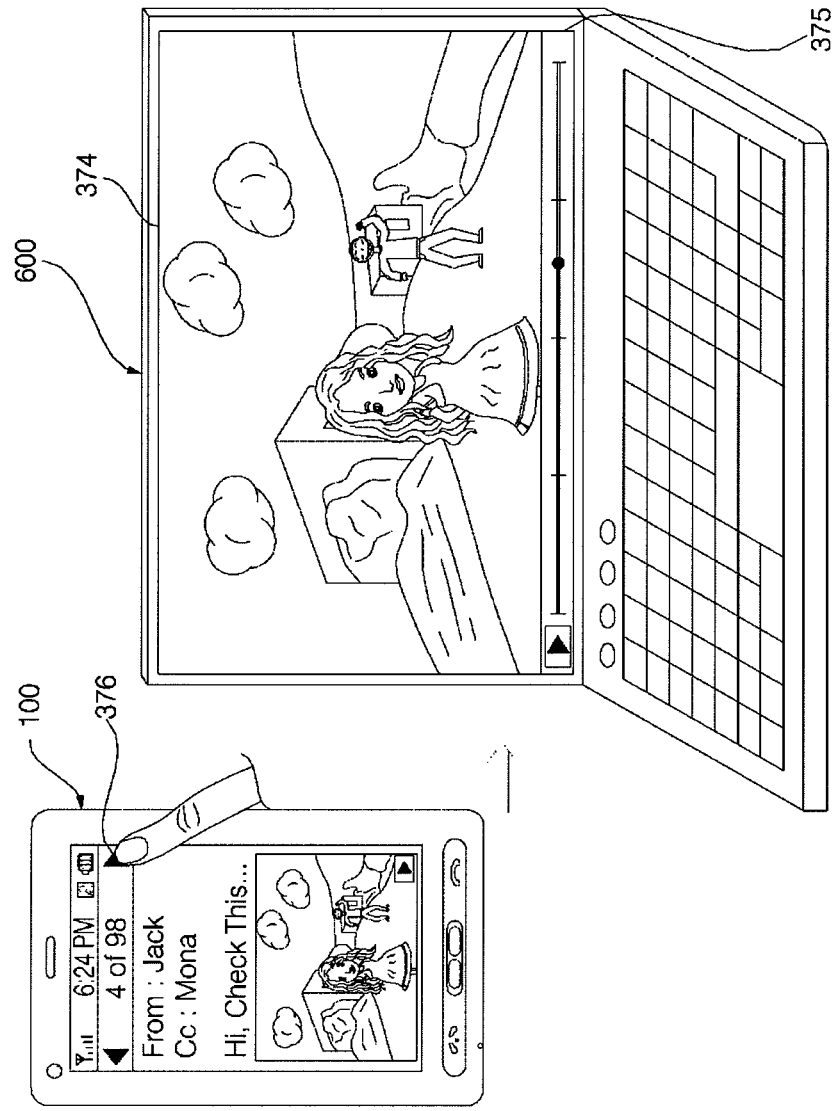

FIG. 14a illustrates a screen 374 displayed on the sixth mobile terminal 600 after content transmission has been completed. When content has been completely transmitted, the sixth mobile terminal 600 displays and reproduces the content in a full screen mode. The sixth mobile terminal 600 may display a progress bar 375 indicating information regarding reproduction of the content. The user of the sixth mobile terminal 600 may control reproduction of the content using the progress bar 375.

As shown in FIG. 14a, the user of the mobile terminal 100 may select an icon 376 corresponding to a command to check a next message or email displayed on the mobile terminal 100. When the icon 376 of the mobile terminal 100 is selected, the mobile terminal 100 may display a message or email next to the currently displayed message or email.

Figure 14B:
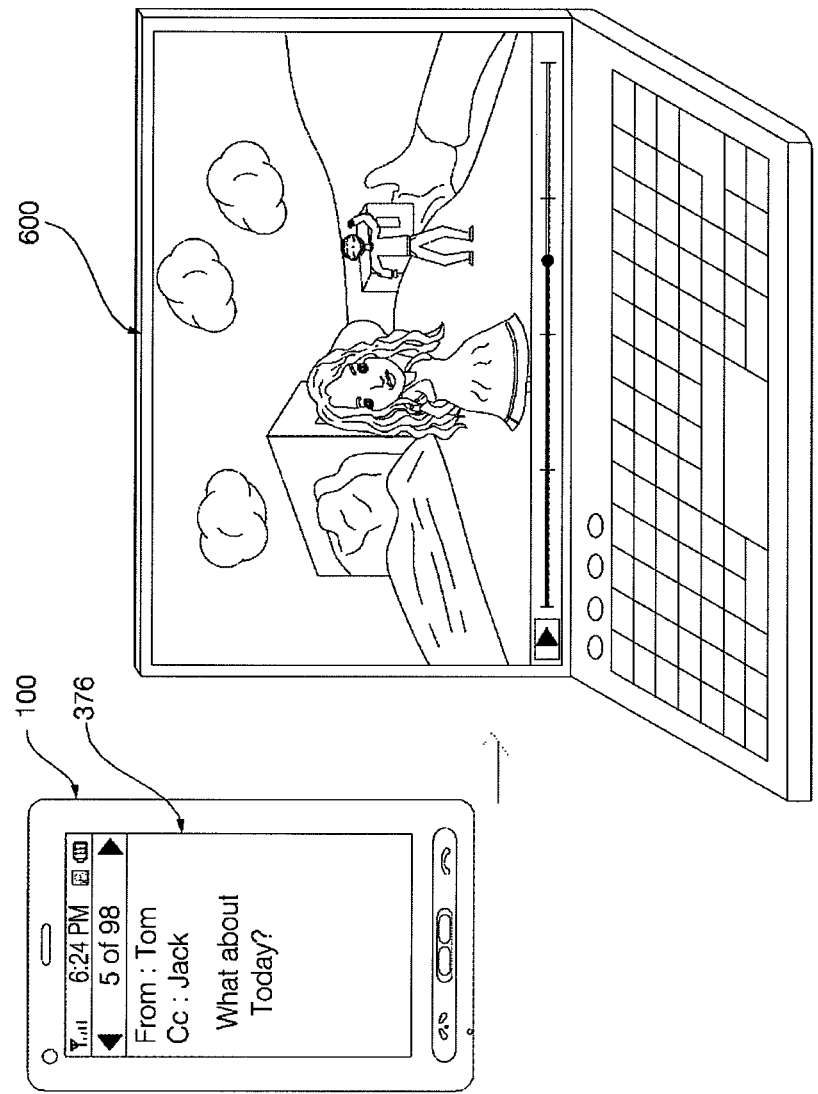

FIG. 14b illustrates an icon 376 of the mobile terminal 100 on which a 5th message or email is displayed. Even when the 5th message or email is displayed, the sixth mobile terminal 600 may continue to display content transmitted by the mobile terminal 100. Thus, the user can check content included in a previous message or email through the sixth mobile terminal 600 while checking a next message or email through the mobile terminal 100.

On the other hand, when content is being displayed on the display unit 151 of the mobile terminal 100, a thumbnail of the content displayed on the display unit 151 may be displayed on the sixth mobile terminal 600 if it is determined that the sixth mobile terminal 600 registered as a trusted device is present within a predetermined distance or in a content share mode.

That is, even when the user of a mobile terminal 100 has not dragged (pushed) content displayed on the display unit 151 of the mobile terminal 100, the mobile terminal 100 may transmit information regarding content to a trusted device if it is determined that the trusted device is within a predetermined distance. The trusted device which has received the information regarding the content may display a thumbnail of the content that is being reproduced on the mobile terminal 100.

In another embodiment, a first mobile terminal 100 which is in the content share mode may detect that another mobile terminal which is in a predetermined distance is in the content share mode. In this case, even when the user of the first mobile terminal 100 has not dragged (pushed) the content that is currently being displayed on the display unit 151, the first mobile terminal 100 may transmit information regarding the content to a different mobile terminal if it is determined that the different mobile terminal is present within a predetermined distance. The mobile terminal that has received the information regarding the content may display a thumbnail of the content that is being reproduced on the first mobile terminal 100.

In this case, if the user of the different mobile terminal drags (pulls) the thumbnail of the content, the first mobile terminal 100 may transmit the content to the different mobile terminal according to a predetermined content transmission format. As described above, the content transmission format may be determined according to the type of the content or may be determined according to the type of the different mobile terminal or may be determined according to information set by default in the first mobile terminal 100.

As is apparent from the above description, according to the present invention, it is possible to conveniently transmit content between mobile terminals that are in a share mode. Before receiving content from a first mobile terminal, a second mobile terminal can display a thumbnail corresponding to the content. The user of the second mobile terminal can check the content that will be received using the thumbnail corresponding to the content. The first and second mobile terminals can provide user interface environments that can intuitively indicate content transmission states. Thus, users can conveniently manage content transmission between at least two mobile terminals.

The mobile terminal and the method of controlling the operation of the same according to the present invention are not limited in their applications to the configurations and methods of the embodiments described above and all or some of the embodiments may be selectively combined to implement various modifications.

The method for controlling the mobile terminal according to the present invention can be embodied as processor readable code on a processor readable medium provided in a mobile terminal. The processor readable medium includes any type of storage device that stores data which can be read by a processor. Examples of the processor readable medium include Read-Only Memory (ROM), Random-Access Memory (RAM), CD-ROMs, magnetic tape, floppy disks, optical data storage devices, and so on. The processor readable medium can also be embodied in the form of carrier waves as signals transmitted over the Internet. The processor readable medium can also be distributed over a network of coupled processor systems so that the processor readable code is stored and executed in a distributed fashion.

Although the present invention has been illustrated and described above with reference to the specific embodiments, the present invention is not limited to the specific embodiments and it will be apparent to those skilled in the art that various modifications can be made to the embodiments without departing from the scope of the present invention as disclosed in the accompanying claims and such modifications should not be construed as departing from the spirit or scope of the present invention.

What is claimed is:

1. A method for controlling operation of a first mobile terminal, the method comprising:
    entering, by the first mobile terminal, a content share mode;
    detecting, by the first mobile terminal, a second mobile terminal which is in the content share mode;
    specifying a content transmission format for transmitting content to the second mobile terminal based on the detection result,
    wherein the content transmission format is at least one of a first transmission format and a second transmission format,
        the first transmission format allows the first mobile terminal to control the transmitted content according to a first command input to the first mobile terminal, and
        the second transmission format allows the second mobile terminal to control the transmitted content according to a second command input to the second mobile terminal;
    displaying, on a display unit of the first mobile terminal, a first indicator representing the first transmission format at one side of the display unit and a second indicator representing the second transmission format at another side of the display unit;
    dragging, on the display unit of the first mobile terminal, an image corresponding to the content to the first indicator or the second indicator for specifying a desired content transmission format;
    upon dragging the image, highlighting one indicator located at the side to which the image is dragged among the first and second indicators and fading out the other indicator;
    transmitting, to the second mobile terminal, information regarding the image corresponding to the content according to the desired content transmission format;
    transmitting, to the second mobile terminal, the content, after a content transmission grant signal is received from the second mobile terminal in response to the thumbnail being dragged to a different region on a display unit of the second mobile terminal; and
    stopping the transmission of the content to the second mobile terminal in response to the thumbnail being dragged out of the display unit of the second mobile terminal,
    wherein the transmitted content is displayed on the display unit of the second mobile terminal in a floating state when the desired content transmission format is the first transmission format, and in a sunken state when the desired content transmission format is the second transmission format, and
    wherein the desired content transmission format automatically changes from the first transmission format to the second transmission format when the first mobile terminal is removed from the second mobile terminal by more than a predetermined distance.

2. The method for controlling operation of the first mobile terminal according to claim 1, wherein the first transmission format allows the second mobile terminal only to display the content on a display unit of the second mobile terminal in the same manner as the display unit of first mobile terminal according to the first command.

3. The method for controlling operation of the first mobile terminal according to claim 2, wherein each of the first command and the second command includes a command for moving, editing, playing, playing back, or stopping playback of the content.

4. The method for controlling operation of the first mobile terminal according to claim 1, wherein the display unit of the first mobile terminal displays the content in a full screen mode when the transmission of the content to the second mobile terminal is completed.

5. The method for controlling operation of the first mobile terminal according to claim 1, further comprising:
stopping the transmission of the content to the second mobile terminal when the determining step determines that the second mobile terminal has rejected the content transmission grant request signal.

6. The method for controlling operation of the first mobile terminal according to claim 1, wherein the first mobile terminal transmits the content to the second mobile terminal without transmitting the content transmission grant request signal and receiving the content transmission grant signal if the first mobile terminal and the second mobile terminal are registered as trusted devices to each other.

7. A method for controlling operation of a second mobile terminal, the method comprising:
entering a content share mode;
receiving, from the first mobile terminal in the content share mode, information regarding content to be received from the first mobile terminal, the information regarding content being information for displaying a thumbnail of the content on a display unit of the second mobile terminal;
displaying, on the display unit of the second mobile terminal, the thumbnail of the content, the displayed thumbnail comprising first text information regarding a user name of the first mobile terminal and second text information regarding a name of a folder in which content for transmission is stored;
transmitting a content transmission grant request signal for receiving the content to the first mobile terminal in response to a dragging of the thumbnail of the content to a different region on the display unit of the second mobile terminal;
receiving the content from the first mobile terminal after the thumbnail is dragged to the different region on the display unit of the second mobile terminal;
rejecting the reception of the content after the thumbnail is dragged to the different region on the display unit of the second mobile terminal which causes the content to be received from the first mobile terminal, and after the second mobile terminal is rotated in a predetermined direction; and
displaying, on the display unit of the second mobile terminal, the received content in a floating state when the content is received according to a give transmission format, and in a sunken state when the content is received according to a show transmission format,
wherein the received content is displayed on the display unit of the second terminal in the sunken state when the first mobile terminal is removed from the second mobile terminal by more than a predetermined distance.

8. The method for controlling operation of the second mobile terminal according to claim 7, further comprising:
displaying the received content in a full screen mode on the display unit of the second mobile terminal when the reception of the content received from the first mobile terminal is completed.

9. A first mobile terminal comprising:
a display unit;
a wireless communication unit configured to transmit and receive signals to and from a second mobile terminal; and
a controller configured to:
when the first mobile terminal has entered a content share mode, detect the second mobile terminal which is capable of transmitting and receiving signals through the wireless command unit and which is in the content share mode,
specify a content transmission format for transmitting content to the second mobile terminal, wherein the content transmission format is at least one of a first transmission format and a second transmission format,
the first transmission format allows the first mobile terminal to control the transmitted content according to a first command input to the first mobile terminal, and
the second transmission format allows the second mobile terminal to control the transmitted content according to a second command input to the second mobile terminal,
control the display unit of the first mobile terminal to display a first indicator representing the first transmission format at one side of the display unit and a second indicator representing the second transmission format at another side of the display unit,
drag, on the display unit of the first mobile terminal, an image corresponding to the content to the first indicator or the second indicator for specifying a desired content transmission format,
upon dragging the image, highlight one indicator located at the side to which the image is dragged among the first and second indicators and fade out the other indicator,
control the wireless communication unit to transmit, to the second mobile terminal, information regarding a thumbnail corresponding to the content according to the desired content transmission format,
control the wireless communication unit to transmit, to the second mobile terminal, the content, after a content transmission grant signal is received from the second mobile terminal in response to the thumbnail being dragged to a different region on the display unit of the second mobile terminal, and
control the wireless communication unit to stop the transmission of the content to the second mobile terminal in response to the thumbnail being dragged out of the display unit of the second mobile terminal,
wherein the transmitted content is displayed on the display unit of the second mobile terminal in a floating state when the desired content transmission format is the first transmission format, and in a sunken state when the desired content transmission format is the second transmission format, and
wherein the desired content transmission format automatically changes from the first transmission format to the second transmission format when the first mobile terminal is removed from the second mobile terminal by more than a predetermined distance.

10. A second mobile terminal comprising:
a display unit;
a wireless communication unit configured to transmit and receive signals to and from a first mobile terminal; and
a controller configured to:
  enter a content share mode,
  control the wireless transmission unit to receive, from the first mobile terminal in the content share mode, information regarding content to be received from the first mobile terminal, the received information regarding the content being information for displaying a thumbnail of the content on the display unit of the second mobile terminal,
  display, on the display unit of the second mobile terminal, the thumbnail of the content, the displayed thumbnail comprising information regarding a user name of the first mobile terminal and information regarding a name of a folder in which content for transmission is stored,
  transmit a content transmission grant request signal for receiving the content to the first mobile terminal in response to a dragging of the thumbnail of the content to a different region on the display unit of the second mobile terminal,
  control the wireless communication unit to receive the content transmitted by the first mobile terminal after the thumbnail is dragged to the different region on the display unit of the second mobile terminal,
  control the wireless communication unit to reject the reception of the content after the thumbnail is dragged to the different region on the display unit of the second mobile terminal which causes the content to be received from the first mobile terminal, and after the second mobile terminal is rotated in a predetermined direction,
  control the display unit of the second mobile terminal to display the received content in a floating state when the content is received according to a give transmission format, and in a sunken state when the content is received according to a show transmission format,
wherein the received content is displayed on the display unit of the second terminal in the sunken state when the first mobile terminal is removed from the second mobile terminal by more than a predetermined distance.

* * * * *